United States Patent
Ghosh et al.

(10) Patent No.: US 9,436,822 B2
(45) Date of Patent: *Sep. 6, 2016

(54) VIRTUAL BROWSING ENVIRONMENT

(71) Applicant: George Mason Research Foundation, Inc., Fairfax, VA (US)

(72) Inventors: Anup K. Ghosh, Centreville, VA (US); Sushil Jajodia, Oakton, VA (US); Yih Huang, Fairfax, VA (US); Jiang Wang, Fairfax, VA (US)

(73) Assignee: George Mason Research Foundation, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,657

(22) Filed: Sep. 9, 2014

(65) Prior Publication Data

US 2016/0019391 A1 Jan. 21, 2016

Related U.S. Application Data

(63) Continuation of application No. 12/827,203, filed on Jun. 30, 2010, now Pat. No. 8,839,422.

(60) Provisional application No. 61/221,749, filed on Jun. 30, 2009.

(51) Int. Cl.
*G06F 21/53* (2013.01)
*G06F 21/56* (2013.01)
(Continued)

(52) U.S. Cl.
CPC .................. *G06F 21/56* (2013.01); *G06F 9/54* (2013.01); *G06F 21/53* (2013.01); *G06F 21/568* (2013.01); *H04L 63/1483* (2013.01); *G06F 2209/541* (2013.01)

(58) Field of Classification Search
None
See application file for complete search history.

(56) References Cited

U.S. PATENT DOCUMENTS

| 5,297,269 A | 3/1994 | Donaldson et al. |
| 5,394,555 A | 2/1995 | Hunter et al. |

(Continued)

FOREIGN PATENT DOCUMENTS

| WO | WO 02/21274 | 3/2002 |
| WO | WO 03/067435 | 8/2003 |

(Continued)

OTHER PUBLICATIONS

Office Action for U.S. Appl. No. 13/690,452, mailed Nov. 8, 2013.

(Continued)

*Primary Examiner* — Hadi Armouche
*Assistant Examiner* — Malcolm Cribbs

(57) ABSTRACT

An embodiment for providing a secure virtual browsing environment includes creating a virtual browsing environment with a virtualized operating system sharing an operating system kernel of a supporting operating system and executing the browser application within the virtual browsing environment. Another embodiment includes receiving a website selection within a browser application, determining if the website selection corresponds to a secure bookmark, and creating a second virtual browsing environment and executing the browser application within the second virtual browsing environment to access the website selection when the website selection corresponds to a website specified as a secure bookmark. Yet another embodiment includes monitoring operation of the operating system within the at least one virtual browsing environment, determining when the operation of the operating system includes potential malicious activity, and terminating the virtual browsing environment when the operation includes potential malicious activity.

21 Claims, 12 Drawing Sheets

(51) Int. Cl.
*H04L 29/06* (2006.01)
*G06F 9/54* (2006.01)

(56) References Cited

U.S. PATENT DOCUMENTS

| | | | |
|---|---|---|---|
| 5,696,822 A | 12/1997 | Nachenberg | |
| 5,842,002 A | 11/1998 | Schnurer et al. | |
| 5,854,916 A | 12/1998 | Nachenberg | |
| 5,895,467 A | 4/1999 | Ubell et al. | |
| 6,067,410 A | 5/2000 | Nachenberg | |
| 6,157,721 A | 12/2000 | Shear et al. | |
| 6,211,871 B1 | 4/2001 | Himmel et al. | |
| 6,377,959 B1 | 4/2002 | Carlson | |
| 6,496,847 B1 | 12/2002 | Bugnion et al. | |
| 6,584,495 B1 | 6/2003 | Bisset et al. | |
| 6,718,482 B2 | 4/2004 | Sato et al. | |
| 6,832,120 B1 | 12/2004 | Frank et al. | |
| 6,845,464 B2 | 1/2005 | Gold | |
| 6,859,889 B2 | 2/2005 | Matsuura et al. | |
| 6,880,110 B2 | 4/2005 | Largman et al. | |
| 6,883,098 B1 | 4/2005 | Roman et al. | |
| 6,944,785 B2 | 9/2005 | Gadir et al. | |
| 7,058,822 B2 | 6/2006 | Edery et al. | |
| 7,086,090 B1 | 8/2006 | Dawson, Jr. et al. | |
| 7,096,381 B2 | 8/2006 | Largman et al. | |
| 7,100,075 B2 | 8/2006 | Largman et al. | |
| 7,111,201 B2 | 9/2006 | Largman et al. | |
| 7,137,034 B2 | 11/2006 | Largman et al. | |
| 7,363,264 B1 | 4/2008 | Doughty et al. | |
| 7,392,541 B2 | 6/2008 | Largman et al. | |
| 7,536,598 B2 | 5/2009 | Largman et al. | |
| 7,552,479 B1 | 6/2009 | Conover et al. | |
| 7,571,353 B2 | 8/2009 | Largman et al. | |
| 7,577,871 B2 | 8/2009 | Largman et al. | |
| 7,584,503 B1 | 9/2009 | Palmer et al. | |
| 7,693,991 B2 | 4/2010 | Greenlee et al. | |
| 7,788,699 B2 | 8/2010 | Largman et al. | |
| 7,836,303 B2 | 11/2010 | Levy et al. | |
| 7,840,801 B2 | 11/2010 | Berger et al. | |
| 7,849,360 B2 | 12/2010 | Largman et al. | |
| 7,873,635 B2* | 1/2011 | Wang | G06F 21/56 707/735 |
| 7,899,867 B1 | 3/2011 | Sherstinsky et al. | |
| 7,979,889 B2 | 7/2011 | Gladstone et al. | |
| 8,001,606 B1 | 8/2011 | Spertus | |
| 8,078,740 B2 | 12/2011 | Franco et al. | |
| 8,196,205 B2 | 6/2012 | Gribble et al. | |
| 8,290,763 B1 | 10/2012 | Zhang | |
| 8,356,352 B1* | 1/2013 | Wawda | G06F 21/53 726/22 |
| 8,370,931 B1 | 2/2013 | Chien et al. | |
| 8,401,982 B1 | 3/2013 | Satish et al. | |
| 8,468,600 B1 | 6/2013 | Kaskel et al. | |
| 8,479,286 B2 | 7/2013 | Dalcher et al. | |
| 8,572,735 B2 | 10/2013 | Ghosh et al. | |
| 8,578,345 B1 | 11/2013 | Kennedy et al. | |
| 8,775,369 B2 | 7/2014 | Largman et al. | |
| 8,839,422 B2 | 9/2014 | Ghosh et al. | |
| 8,856,782 B2 | 10/2014 | Ghosh et al. | |
| 8,856,937 B1* | 10/2014 | Wuest | H04L 63/1483 713/188 |
| 8,881,284 B1* | 11/2014 | Gabriel | G06F 21/566 709/203 |
| 9,081,959 B2 | 7/2015 | Ghosh et al. | |
| 2002/0004799 A1 | 1/2002 | Gorelik et al. | |
| 2002/0013802 A1 | 1/2002 | Mori et al. | |
| 2003/0023895 A1 | 1/2003 | Sinha et al. | |
| 2004/0008652 A1 | 1/2004 | Tanzella et al. | |
| 2004/0025158 A1 | 2/2004 | Traut | |
| 2004/0064735 A1 | 4/2004 | Frazier et al. | |
| 2004/0093372 A1 | 5/2004 | Chen et al. | |
| 2005/0160133 A1 | 7/2005 | Greenlee et al. | |
| 2006/0021029 A1 | 1/2006 | Brickell et al. | |
| 2006/0136720 A1 | 6/2006 | Armstrong et al. | |
| 2006/0168156 A1 | 7/2006 | Bae et al. | |
| 2006/0271661 A1 | 11/2006 | Qi et al. | |
| 2006/0277433 A1 | 12/2006 | Largman et al. | |
| 2006/0294519 A1 | 12/2006 | Hattori et al. | |
| 2007/0044151 A1 | 2/2007 | Whitmore | |
| 2007/0079307 A1 | 4/2007 | Dhawan et al. | |
| 2007/0106993 A1 | 5/2007 | Largman et al. | |
| 2007/0107058 A1 | 5/2007 | Schuba et al. | |
| 2007/0174915 A1* | 7/2007 | Gribble | G06F 21/53 726/24 |
| 2007/0192866 A1 | 8/2007 | Sagoo et al. | |
| 2007/0208822 A1* | 9/2007 | Wang | H04L 63/1416 709/217 |
| 2007/0240212 A1 | 10/2007 | Matalytski | |
| 2007/0271610 A1 | 11/2007 | Grobman | |
| 2007/0289019 A1 | 12/2007 | Lowrey | |
| 2008/0010683 A1* | 1/2008 | Baddour | G06F 17/30864 726/24 |
| 2008/0016339 A1 | 1/2008 | Shukla | |
| 2008/0059556 A1 | 3/2008 | Greenspan et al. | |
| 2008/0082976 A1 | 4/2008 | Steinwagner et al. | |
| 2008/0127348 A1 | 5/2008 | Largman et al. | |
| 2008/0141266 A1 | 6/2008 | Hunt et al. | |
| 2008/0215852 A1 | 9/2008 | Largman et al. | |
| 2008/0244743 A1 | 10/2008 | Largman et al. | |
| 2008/0244747 A1 | 10/2008 | Gleichauf et al. | |
| 2008/0320594 A1 | 12/2008 | Jiang | |
| 2009/0044265 A1 | 2/2009 | Ghosh et al. | |
| 2009/0125902 A1 | 5/2009 | Ghosh et al. | |
| 2009/0158432 A1 | 6/2009 | Zheng et al. | |
| 2009/0300739 A1 | 12/2009 | Nice et al. | |
| 2009/0328008 A1 | 12/2009 | Mital et al. | |
| 2010/0005531 A1 | 1/2010 | Largman et al. | |
| 2010/0037235 A1 | 2/2010 | Larimore et al. | |
| 2010/0064039 A9 | 3/2010 | Ginter et al. | |
| 2010/0115621 A1 | 5/2010 | Staniford et al. | |
| 2010/0122342 A1 | 5/2010 | El-Moussa et al. | |
| 2010/0122343 A1 | 5/2010 | Ghosh et al. | |
| 2010/0125903 A1 | 5/2010 | Devarajan et al. | |
| 2010/0138639 A1 | 6/2010 | Shah et al. | |
| 2010/0146523 A1* | 6/2010 | Brigaut | G06F 17/30203 719/330 |
| 2010/0192011 A1 | 7/2010 | Largman et al. | |
| 2010/0223613 A1 | 9/2010 | Schneider | |
| 2010/0235830 A1* | 9/2010 | Shukla | G06F 9/44526 718/1 |
| 2011/0047620 A1 | 2/2011 | Mahaffey et al. | |
| 2011/0083180 A1 | 4/2011 | Mashevsky et al. | |
| 2011/0099620 A1 | 4/2011 | Stavrou et al. | |
| 2011/0145923 A1 | 6/2011 | Largman et al. | |
| 2011/0191851 A1 | 8/2011 | Largman et al. | |
| 2012/0297457 A1 | 11/2012 | Schulte et al. | |
| 2013/0145463 A1 | 6/2013 | Ghosh et al. | |
| 2015/0324586 A1 | 11/2015 | Ghosh et al. | |

FOREIGN PATENT DOCUMENTS

| | | |
|---|---|---|
| WO | WO 2005/074433 | 8/2005 |
| WO | WO 2005/074434 | 8/2005 |
| WO | WO 2005/116804 | 12/2005 |
| WO | WO 2007/048062 | 4/2007 |
| WO | WO 2008/027563 | 3/2008 |
| WO | WO 2008/027564 | 3/2008 |
| WO | WO 2008/092031 | 7/2008 |

OTHER PUBLICATIONS

Office Action for U.S. Appl. No. 13/690,452, mailed Jun. 12, 2014.
Office Action for U.S. Appl. No. 13/690,452, mailed Jan. 30, 2015, 21 pages.
International Search Report and Written Opinion mailed Mar. 12, 2013 for International Application No. PCT/US2012/067311.
Office Action for U.S. Appl. No. 12/558,841, mailed Apr. 3, 2012.
Office Action for U.S. Appl. No. 12/558,841, mailed Jan. 30, 2013.
Office Action for U.S. Appl. No. 12/558,841, mailed Jan. 9, 2014.
Office Action for U.S. Appl. No. 12/558,841, mailed Sep. 30, 2014.
Office Action for U.S. Appl. No. 12/037,412, mailed Aug. 16, 2013.
Final Office Action for U.S. Appl. No. 12/037,412, mailed Apr. 23, 2012.

(56) References Cited

OTHER PUBLICATIONS

Office Action for U.S. Appl. No. 12/037,412, mailed Oct. 27, 2011.
Office Action for U.S. Appl. No. 12/827,203, mailed Jan. 15, 2013.
Office Action for U.S. Appl. No. 12/827,203, mailed Apr. 17, 2014.
Adabala et al, From virtualized resources to vritual computing grids: the In-VIGO system. [online] (Nov. 11, 2003), Elsevier, pp. 1-14. Retrieved from the Internet: <http://users.cis.fiu.edu/-zhaom/research/fgcs.pdf>.
Huang, Y. et al., Efficiently tracking application interactions using lightweight virtualization, ACM, Oct. 31, 2008, 9 pages.
Peterson et al., "A Flexible Containment Mechanism for Executing Untrusted Code," [online] (2002). University of California, pp. 207-225. Retrieved from the Internet: <http://mse.uk.distfiles.macports.org/sites/ftp.wiretapped.net/pub/security/development/secure-programming/peterson-et-al-2002-a-flexible-containment-mechanism-for-executing-untrusted>.
Royal et al., "PolyUnpack: Automating the Hidden-Code Extraction of Unpack-Executing Malware". Computer Security Application Conference, 2006. ACSAC '06. 22nd Annual [online], Dec. 2006 [retrieved Apr. 4, 2014], Retrieved from the internet:<URL: http://ieeexplore.ieee.org/stamp/stamp.jsp?tp=&arnumber=4041175>.
Sapuntzakis, C. et al., "Virtual Appliances for Deploying and Maintaining Software," [online] (2003), ACM, Retrieved from the Internet <URL: http://dl.acm.org/citation.cfm?id=1051965>, 15 pages.
Ugurlu, "Stealth Sandbox Analysis of Malware," PhD Thesis, Bilkent University (Ankara, Turkey) [online], Published Aug. 2009 [retrieved on Feb. 7, 2013] Retrieved from the Internet <URL:http://www.thesis.bilkent.edu.tr/0003921.pdf>.
Office Action for U.S. Appl. No. 14/797,847, mailed Nov. 23, 2015, 22 pages.
Morales et al., "Building malware infection trees," Malicious and unwanted Software (Malware), Oct. 2011, 6th International Conference on (pp. 50-57), IEEE 2011.
Wang, et al., Web Canary: A Virtualized Web Browser to Support Large-Scale Silent Collaboration in Detecting Malicious Web Sites (Web Canary), Nov. 15, 2008.
Jiang Wang, et al., "SafeFox: A Safe Lightweight Virtual Browsing Environment", Proceedings of the 43$^{rd}$ Hawaii International Conference on System Sciences, 2010.
Capture Communication Protocol, Sep. 22, 2007, Victoria University of Wellington, New Zealand.
Seifert, et al., Capture-HPC, About Capture Honeypot/Honeyclient, Sep. 22, 2008, Victoria University of Wellington, New Zealand.
Capture-HPC Client Honeypot/Honeyclient, Sep. 2, 2008, Victoria University of Wellington, New Zealand.
*Knowyou Enemy: Malicious Web Servers*, Aug. 9, 2007, http://www.honeypot.org.
Tzi-cker Chiueh et al., *Spout: a transparent distributed execution engine for Java applets, Computer Science Department, State University of New York at Stony Brook*, http://www.ecsl.es.sunyb.edu/spout.html. Apr. 2000.
Sushil Jajodia, et al., Application-Level Isolation to Cope With Malicious Database Users, The MITRE Corporation, Center for Secure Information Systems, and Department of Information and Software Engineering George Mason University, Dec. 1998.
Peng Liu, et al., Intrusion Confinement by Isolation in Information Systems, Department of Information Systems, University of Maryland, Baltimore County, The MITRE Corporation, Center for Secure Information Systems, and Department of Information and Software Engineering George Mason University, vol. 43, The International Federation for Information Processing (IFIP), pp. 3-18, Jul. 25-28, 1999.
Dahlia Malkhi, et al., Secure Execution of Java Applets using a Remote Playground, AT&T Labs Research, IEEE Transactions on Software Engineering, vol. 26, Issue 12, Dec. 2000, pp. 1197-1209.
R. Sekar, et al., A Specification-Based Approach for Building Survivable Systems, 21$^{st}$ National Information Systems Security Conference, Oct. 1998.

*Software for the Secure Management and deployment of Java, Digitivity, Inc.,* Aug. 6, 1998, http://www.digitivity.com/html/body_products.html.
Tarek Dehni, et al., Intelligent Networks and the HP OpenCall Technology, Aug. 1997, Article 6, Hewlett-Packard Journal, pp. 1-14.
Thomas C. Bressoud, TFT: A Software System for Application-Transparent Fault Tolerance, Twenty-Eight Annual International Symposium on Fault-Tolerant Computing, 1998.
Arbaugh, et al., Automated Recovery in a Secure Bootstrap Process, University of Pennsylvania, Distributed Systems Laboratory, Aug. 1, 1997.
Thomas C. Bressoud, et al., Hypervisor-Based Fault-Tolerance, ACM Transactions on Computer Systems, vol. 14, No. 1, Feb. 1996, pp. 80-107.
Jonback, et al., Open architecture in the Core of AXE, Ericsson Review No. 1, 2001.
Solstice DiskSuite 4.2.1 Reference Guide, Sun Microsystems, Inc., Feb. 2000.
Jieh-Sheng Lee et al., A Generic Virus Detection Agent on the Internet, Proceedings of the Thirtieth Annual Hawaii International Conference on System Sciences 1997.
Grzegorz Czajkowski, Application Isolation in the Java Virtual Machine, Sun Microsystems Laboratories, Proceedings of the 15th ACM SIGPLAN conference on Object-oriented programming, systems, languages, and applications vol. 35, Issue 10, Oct. 2000, pp. 354-366.
Lenny Zeltser, Reverse Engineering Malware, May 2001.
The Symantec Enterprise Papers, Understanding and Managing Polymorphic Viruses, vol. XXX, copyright 1996.
Jeremy Sugerman, et al., Virtualizing I/O Devices on VMware Workstation's Hosted Virtual Machine Monitor, Proceedings of the 2001 USENIX Annual Technical Conference, Jun. 2001.
Constantine Sapuntzakis, et al., "Virtual Appliances for Deploying and Maintaining Software", Computer Systems Laboratory, Stanford University, Oct. 2003.
JMunro, *Virtual Machines & VMware, Part 1*, Dec. 21, 2001, http://www.extremetech.com/computing/72186-virtual-machines-vmware-part-i.
JMunro, *Virtual Machines & VMware, Part II*, Dec. 28, 2001, http://www.extremetech.com/computing/72268-virtual-machines-vmware-part-ii.
J. Steven Fritzinger, et al., Java Security, Sun Microsystems, Inc. 1996.
U.S. Appl. No. 61/221,749, filed Jun. 30, 2009.
http://collaboratecom.org/2008/program.php—Orlando, FL, Nov. 2008.
CollaborateComm 2008 Selected Publications Table of Contents, Nov. 2008.
CollaborateComm 2008 Registration Policy, Orlando, FL, Nov. 13-16, 2008, 3 pages.
*Timeline-Capture HPC*, Nov. 13, 2008, 2 pages https://projects.honeynet.org/capture-hpc/timeline?from=20081113T21%3A15%3A49Z&precision=second.
*Timeline Capture HPC*, Apr. 15, 2008, 4 pages https://projects.honeynet.org/capturehpc/timeline?from=20080415T13%3A53%3A08Z&precision=second.
*WikiStart (history) Capture-HPC*, https://projects.honeynet.org/capture-hpc/wiki/WikiStart?action=history, Nov. 20, 2015.
https://www.microsoft.com/resources/documentation/windows/xp/all/proddocs/enus/shutdown.mspx?mfr=true, Microsoft Windows XP—Shutdown, Feb. 23, 2016.
*Vir2us, Inc. v. Invincea, Inc. and Invincea Labs, LLC*—Civil Action No. 2:15-cv-00162HCM-LRL—Vir2us' Opening Claim Construction Brief—Document 48, Dec. 23, 2015, 31 pages.
*Vir2us, Inc. v. Invincea, Inc. and Invincea Labs, LLC*—Civil Action No. 2:15-cv-00162HCM-LRL—Krein Decl in Support—Document 50, Dec. 23, 2015, 18 pages.
*Vir2us, Inc. v. Invincea, Inc. and Invincea Labs, LLC*—Civil Action No. 2:15-cv-00162HCM-LRL—Invincea's Opening Claim Construction Brief—Document 51, Dec. 23, 2015, 31 pages.

(56) References Cited

OTHER PUBLICATIONS

*Vir2us, Inc.* v. *Invincea, Inc. and Invincea Labs, LLC*—Civil Action No. 2:15-cv-00162HCM-LRL—Decl of Rubin in Support of Invincea's Opening Claim Construction Brief—Document 52, Dec. 23, 2015, 34 pages.
*Vir2us, Inc.* v. *Invincea, Inc. and Invincea Labs, LLC*—Civil Action No. 2:15-cv-00162HCM-LRL—Invincea's Responsive Claim Construction Brief—Document 57, Jan. 11, 2016, 31 pages.
*Vir2us, Inc.* v. *Invincea, Inc. and Invincea Labs, LLC*—Civil Action No. 2:15-cv-00162HCM-LRL—Supp Decl of Rubin in Support of Invincea's Responsive Claim Construction Brief—Document 57-1, Jan. 11, 2016, 13 pages.
*Vir2us, Inc.* v. *Invincea, Inc. and Invincea Labs, LLC*—Civil Action No. 2:15-cv-00162HCM-LRL—Vir2us' Responsive Claim Construction Brief—Document 58, Jan. 11, 2016, 31 pages.
*Vir2us, Inc.* v. *Invincea, Inc. and Invincea Labs, LLC*—Civil Action No. 2:15-cv-00162HCM-LRL—Rebuttal Declaration of Krein in Support of Vir2us' Responsive Claim Construction Brief—Document 59, Jan. 11, 2016, 18 pages.
*Vir2us, Inc.* v. *Invincea, Inc. and Invincea Labs, LLC*—Civil Action No. 2:15-cv-00162HCM-LRL—Exhibit 2—Joint Claim Construction and Prehearing Statement, Document 61-2, Jan. 18, 2016, 4 pages.
*Vir2us, Inc.* v. *Invincea, Inc. and Invincea Labs, LLC*—Civil Action No. 2:15-cv-00162HCM-LRL—Exhibit 3—Joint Claim Construction and Prehearing Statement—Document 61-3, Jan. 18, 2016, 9 pages.
*Vir2us, Inc.* v. *Invincea, Inc. and Invincea Labs, LLC*—Civil Action No. 2:15-cv-00162HCM-LRL—Claim Construction Memorandum and Order, Document 69, Feb. 5, 2016, 16 pages.
*Vir2us, Inc.* v. *Invincea, Inc. and Invincea Labs, LLC*—Civil Action No. 2:15-cv-00162HCM-LRL—Vir2us Preliminary Invalidity Contentions, Exhibits, and Supporting Documents, Nov. 23, 2015.

\* cited by examiner

VIRTUAL BROWSING ENVIRONMENT

CROSS-REFERENCE TO RELATED APPLICATIONS

This application is a continuation of U.S. patent application Ser. No. 12/827,203, filed Jun. 30, 2010 and entitled "Virtual Browsing Environment," now U.S. Pat. No. 8,839,422, which claims priority to U.S. Provisional Patent Application No. 61/221,749, filed on Jun. 30, 2009, and entitled "SafeFox: A Safe Lightweight Virtual Browsing Environment," the entire content of each of which is hereby incorporated herein by reference in its entirety.

STATEMENT REGARDING FEDERALLY SPONSORED RESEARCH OR DEVELOPMENT

This invention was made with government support under Army contract #W31P4Q-07-C-0244 awarded by Defense Advance Research Projections Agency. The government has certain rights in the invention.

DETAILED DESCRIPTION OF EMBODIMENTS

Figure 1:
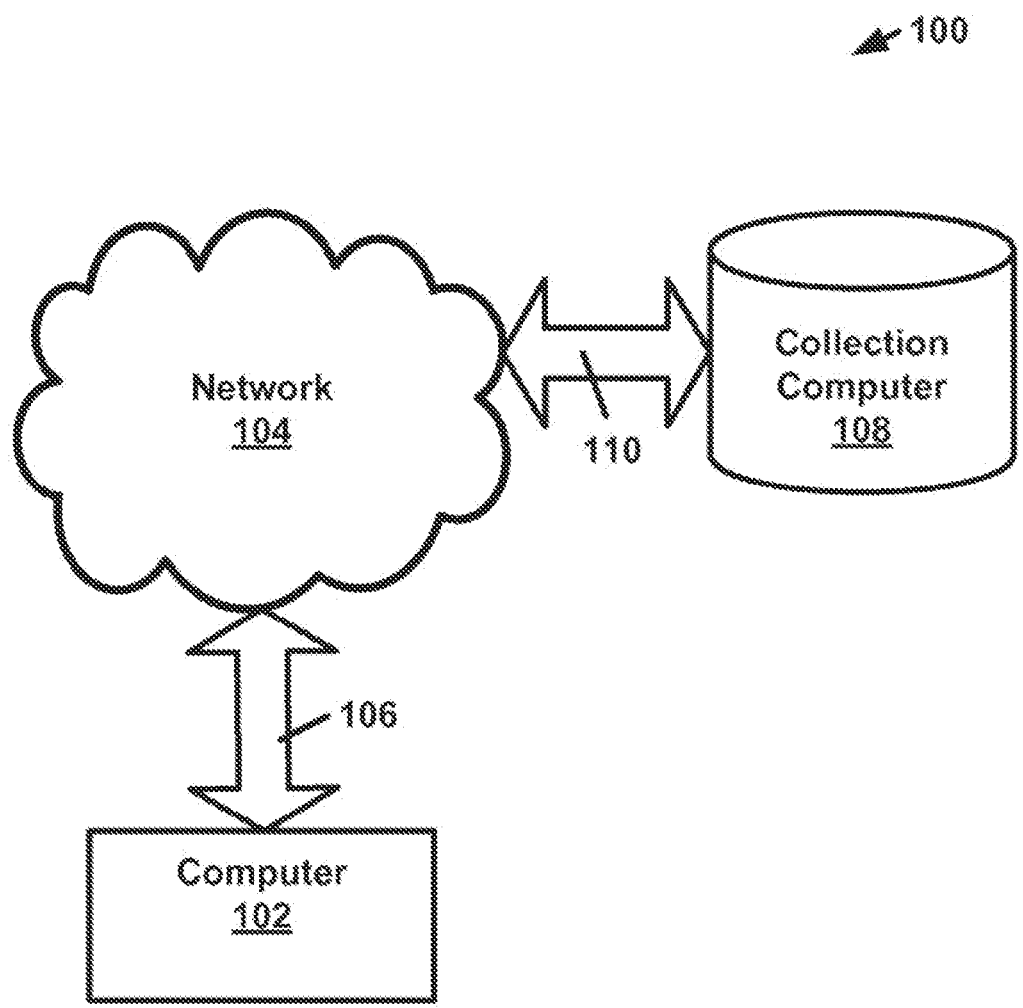
FIG. 1 illustrates a system for providing a virtual browsing environment according to an aspect of an embodiment of the invention.

FIG. 1 illustrates a system 100 for providing a virtual browsing environment according to one embodiment of the invention. As described below, embodiments of the system 100 may provide a virtual browsing environment for executing a browser application on a computer. By executing the browser application within a separate virtual browsing environment, other applications, data, and modules of the computer may be protected from any malicious activity associated with the execution of the browser application. In addition, because in some embodiments only the browser application may be executed within the virtual browsing environment, malicious activity associated with the execution of the browser application may be easily detected.

As shown in FIG. 1, the system 100 may include at least one computer 102, at least one network 104, and at least one collection computer ("CC") 108. The computer 102 and the network 104 may be connected by a connection 106, and the network 104 and the collection computer 108 may be connected by a connection 110. The network 104 may include the Internet, a local area network, a wide area network, or combinations thereof. It should be understood that the network 104 may include one or more networks or communication systems, such as the Internet, the telephone system, satellite networks, cable television networks, and various other private and public networks. In addition, the connections 106 and 110 may include wired connections (such as wires, cables, fiber optic lines, etc.), wireless connections, or combinations thereof. Furthermore, although not shown, other computers, systems, devices, and networks may also be connected to the network 104.

With continued reference to FIG. 1, the collection computer 108 may receive data from the network 104 over the connection 110. In some embodiments, the collection computer 108 may also send data to the network 104 or one or more computers or networks. The collection computer 108 may also include hardware, such as one or more memory modules, one or more processors, and one or more input/output modules. In addition, the collection computer 108 may include an operating system to manage the hardware. In some embodiments, the collection computer 108 may also include a database that stores data received from the network 104. The data included in the database may be stored in computer's 108 one or more memory modules, and the data may be managed by a database management application. For example, the collection computer 108 may include a MySQL server running on a L.A.M.P. (Linux, Apache, mySQL, and PHP) stack or other web-based database server systems.

Figure 2:
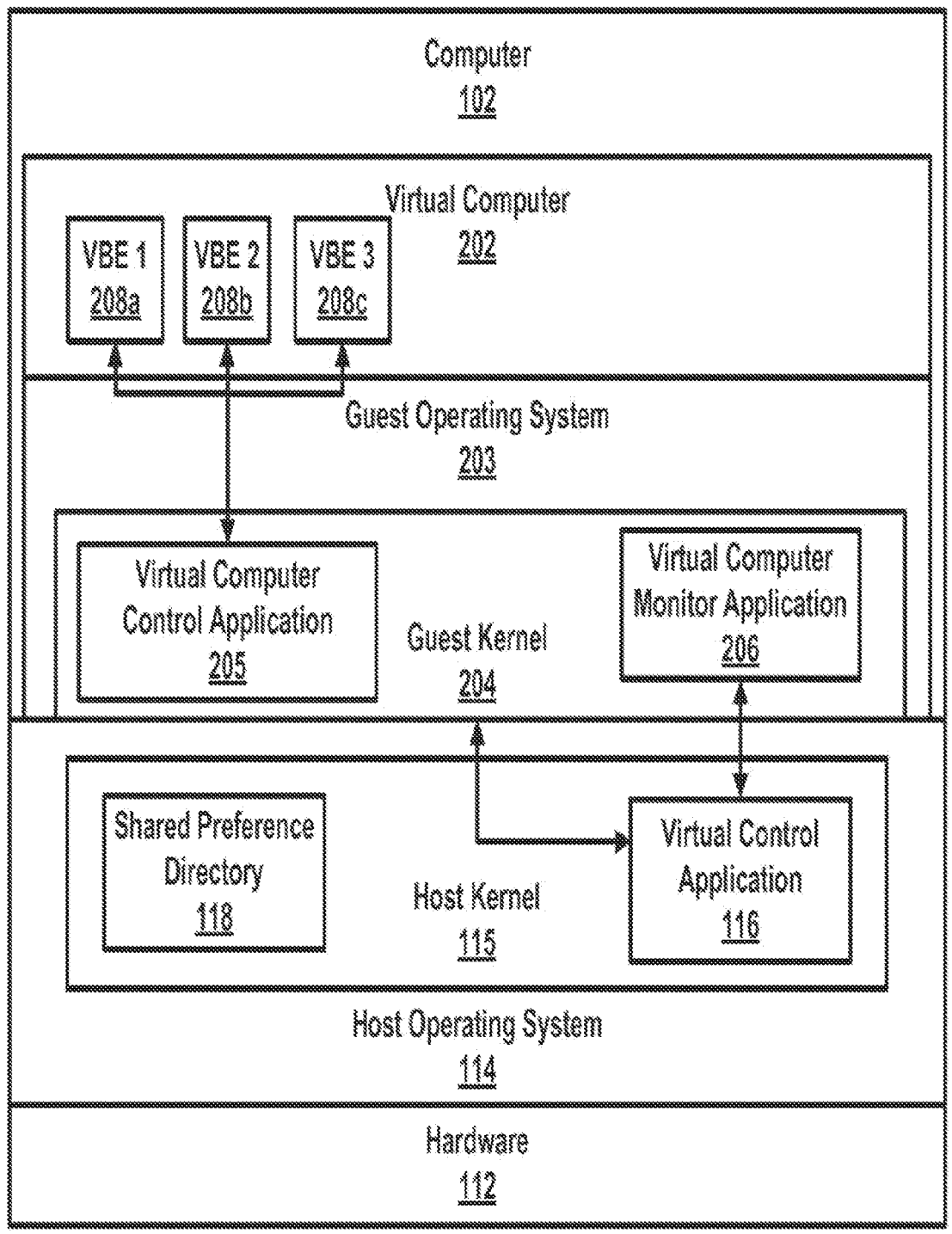
FIG. 2 illustrates a computer included in the system of FIG. 1, according to one embodiment of the invention.

FIG. 2 illustrates the computer 102 of FIG. 1 according to one embodiment of the invention. It should be understood that the computer 102 may include a desktop computer, a laptop computer, a tablet computer, an electronic reading device (e.g., Amazon Kindle), a mobile telephone (e.g., Apple iPhone), a personal data assistant or any other device that may execute software applications. As shown in FIG. 2, the computer 102 may include hardware 112, such as one or more processors, memory modules, input/output modules, or combinations thereof. The one or more input/output modules may communicate with one or more input/output devices connected to the computer 102, such as printers, scanners, monitors, networks (including the network 104), external memory modules, etc. The memory modules may include one or more random-access memories, read-only memories, disks, application specific integrated circuits, programmable read-only memories, or combinations thereof. The memory modules may store data, applications, and combinations thereof. For example, the memory modules may include non-transitory computer readable mediums that store instructions, which perform particular functionality when executed by one or more processors included in the hardware 112. For example, as shown in FIG. 2, the computer 102 may also include a host operating system 114 that provides an interface between the hardware 112 and a user operating the computer 102. The host operating system 114 may be stored in the one or more memory modules and may be executed on the one or more processors included in the hardware 112. The host operating system 114 may include a well-known operating system, such as Microsoft Windows, Linux Redhat, UNIX, or Apple MacOS.

The host operating system 114 may include at least one host kernel 115. The host kernel 115 may manage the communication between the hardware 112 and applications executed by the hardware 112. For example, the host kernel 115 may provide inter-application communication, may manage data retrieved from and stored to the one or more memory modules included in the hardware 112 by the applications, and may manage data received from and output to the input/output modules included in the hardware 112.

As shown in FIG. 2, the host kernel 115 may include a virtual control application ("VCA") 116. As described in more detail below, the host kernel 115 may use the virtual control application 116 to create and manage a virtual computer. Accordingly, the VCA 116 may provide virtualization functionality, such as that provided by Windows VMware workstation or player; Sun Microsystems VirtualBox; Parallels virtualization products, Xen virtualization products, or combinations thereof. The host kernel 115 may also include a shared preference directory 118, which may store preferences for an application, such as a browser application.

It should be understood that the one or more memory modules included in the hardware 112 may store other applications besides those explicitly shown in FIG. 2. In addition, the functionality provided by the applications stored in the one or more memory modules may be combined and distributed in various configurations. For example, the VCA 116 may be combined with other applications or may be distributed among several applications. The one or more memory modules may also store other data used by the host operating system 114 or other applications executed within the computer 102.

In operation, as shown in FIG. 2, the host kernel 115 may execute the VCA 116 to create a virtual computer 202. The virtual computer 202 may include its own guest host operating system 203 with a guest kernel 204. The guest operating system 203 and guest kernel 204 may operate similar to the host operating system 114 and host kernel 115. This type of virtualization where a generally complete copy of an operating system is provided within a virtual computer is generally referred to as "full virtualization." Outside of the virtual computer 202, the host operating system 114 may continue to interact and manage the hardware 112, while the guest operating system 203 also may interact and manage the hardware 112. Therefore, the virtual computer 202 may create a second, isolated computing environment within the computer 102. Each computing environment may execute different applications, access data from different locations in a memory module or from different memory modules, provide different operating systems, or combinations thereof.

For example, in some embodiments, the host operating system 114 may include a Microsoft Windows operating system (e.g., Windows XP, Vista, 7) and the guest operating system 203 may include a Linux operating system (e.g., Redhat Enterprise Linux 5.3). Therefore, while the host operating system 114 may only execute applications designed for a Windows operating system, the guest operating system 203 may execute applications designed for a Linux operating system. In this situation, the shared preference directory 118 may be a Windows file but may be mapped to a Linux file or directory, which allows the guest operating system 203 to access and manipulate the shared preference directory 118 although it is part of the generally non-compatible host operating system 114.

As mentioned above, creating the virtual computer 202 may provide isolation between computing performed within the virtual computer 202 and computing performed outside the virtual computer 202 through the host operating system 114. For example, the virtual computer 202 may be unaware of any computing performed outside of the virtual computer 202. Accordingly, an application executed within the virtual computer 202 generally cannot access an application executed outside the virtual computer 202. For example, in some embodiments, the only portion of the host operating system 114 visible to and accessible by the guest operating system 203 is the shared preference directory 118. Therefore, the guest operating system 203 may not access or modify the host operating system 114 except for the shared preference directory 118. This restriction may limit the access of a malicious or compromised guest operating system 203 to only the shared directory and may prevent any malicious activity occurring within the virtual computer 202 from compromising the host operating system 114 and infecting the entire computer 102.

As shown in FIG. 2, the guest kernel 204 may include a virtual computer control application ("VCCA") 205 and a virtual computer monitor application ("VCMA") 206. The VCCA 205 may manage the operation of the virtual computer 202. For example, as shown in FIG. 2, the VCCA 205 may create one or more virtual browsing environments ("VBEs") 208 (e.g., VBE 1 208a, VBE 2 208b, and VBE 3 208c). Once created, the VCMA 206 may monitor the operation of each VBE 208 and may report each VBE's operation to the VCA 116. To create a VBE 208, the VCCA 205 may use one or more virtualization modules or applications, such as OpenVZ, UnionFS patches, Solaris Zones, BSD Jail, or combinations thereof.

Figure 3:
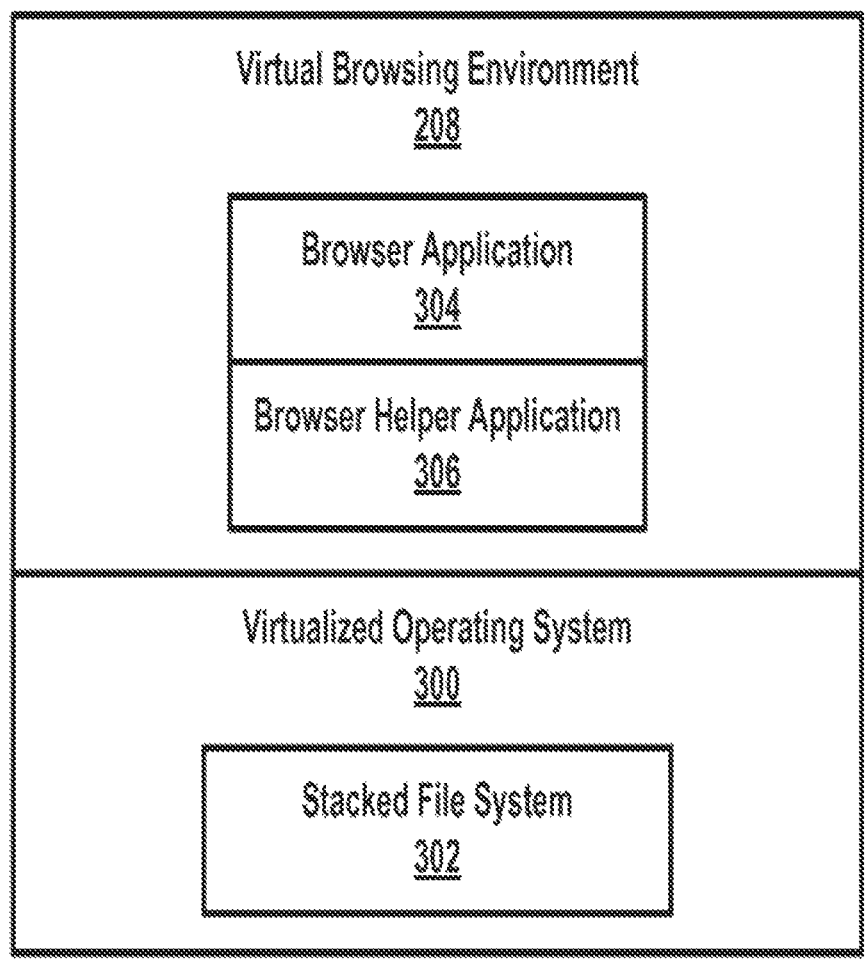
FIG. 3 illustrates a virtual browsing environment provided by the computer of FIG. 2, according to an aspect of an embodiment of the invention.

FIG. 3 illustrates a VBE 208 according to one embodiment of the invention. As shown in FIG. 3, the VBE 208 may include a virtualized operating system 300 (e.g., CentOS Linux 5.3). Rather than including a complete operating system with a kernel, the virtualized operating system 300 may share the guest kernel 204 of the guest operating system 203. Creating a virtual environment that shares a kernel from another operating system is often referred to as "lightweight" virtualization. Lightweight virtual environments generally operate like full virtual environments (e.g., the virtual computer 202), but generally require less overhead due to the shared kernel. However, because the VBE 208 and the virtual computer 202 share the same kernel (i.e., the guest kernel 203), in some embodiments, the VBE 208 generally executes the same or a version of the same operating system as the virtual computer 202.

Each VBE 208 may execute a browser application 304. In some embodiments, the browser application 304 may be stored in the one or more memory modules included in the hardware 112 and may be executed by the one or more processors included in the hardware 112. The browser application 304 may send and receive data from the network 104 and may present at least received data to a user. For example, the browser application 304 may be used to access a website available over the network 104 (e.g., the Internet) and display the contents of the website to a user. The browser application 304 may include a well-known browser application, such as Microsoft Internet Explorer, Mozilla Firefox, Google Chrome, or Apple Safari. The preferences stored in the shared preference directory 118 for the browsing application may include browsing history, bookmarks, secure bookmarks (as described below with respect to FIG. 4), cookies, passwords, add-ons, personal information, etc.

In some embodiments, configuration files of the browser application 340 may be modified. For example, the browser application 340 may be configured to use a specific proxy, such as the web application 502 described below with respect to FIG. 5. In addition, as also described below, in some embodiments, the browser application 340 may be executed in different modes and each mode may be configured differently. For example, in some modes, the browser application 340 may be configured to import user preferences stored in the shared preference directory 118 and in another mode the browser application 340 may be configured to operate without importing user preferences from the shared preference directory 118.

In some embodiments, each VBE 208 may be assigned its own process namespace, internet protocol ("IP") address, and file system. For example, as shown in FIG. 3, the virtualized operating system 300 may include a stacked file system 302. The stacked file system 302 may provide a file system accessible by applications executed within the VBE 208 (e.g., the browser application 304). The whitepaper titled "Efficiently Tracking Application Interactions using Lightweight Virtualization" authored by Yih Huang, Angelos Stavrou, Anup K. Ghosh, and Sushil Jajodia, the entire contents of which is herein incorporated by reference, describes a method of creating a stacked file system for lightweight virtual environments. As described in this whitepaper, initially, a read-only template of a VBE 208 may be created (e.g., upon installation of the VCA 116, the VCCA 205, or combinations thereof). The read-only template may include a copy of any data and applications that will be executed within the VBE 208. In some embodiments, rather than creating a separate physical copy of the data and applications, the read-only template may only include a mapping to the data and applications already stored in the computer's 102 hardware 112. For example, the read-only template may include a copy of or a mapping to the binary code and libraries for the browser application 304.

When a VBE 208 is created, a daemon or application (e.g., a Perl script) included in the VCCA 205 may construct a new stacked file system for the new VBE 208 by creating a writeable copy of the read-only template (i.e., a writable layer). In some embodiments, the daemon may use UnionFS functionality to create the stacked file system. The writable layer may be associated with the newly-created VBE 208 and may be mounted as the root of the file system for the new VBE 208. As mentioned above, rather than including separate physical copies of the data and applications included in the read-only template, the writable layer may include mappings to the copied data and applications. This mapping further may reduce the amount of memory needed even when multiple VBEs 208 are created.

The application included in the VCCA 205 may also allocate to each new VBE 208 an IP address. As described in detail below, in some embodiments, the browser application 304 executed with in a VBE 208 may be executed in various browsing modes. Depending on the browsing mode of the browser application 304 to be executed within the new VBE 208, the VCAA 205 may modify the creation of the new VBE 208. For example, when a new VBE 208 is created for a master mode browser application 304, the VCCA 205 may assign the new VBE 208 a predetermined fixed IP address. However, when the VCCA 205 creates new VBEs 208 in other operating modes, the VCCA 205 can dynamically assign IP addresses to the new VBEs 208. A new VBE 208 can use the domain name server ("DNS") table from the guest operating system 203, or a new VBE 208 can use an arbitrary "trusted" DNS service, such as Open DNS, to provide additional security.

After assigning a new VBE 208 an IP address, the application within the VCCA 205 can boot up the new VBE 208, execute the browser application 304 within the VBE 208, and project the browser application 304 window or output to a display output of the computer 102. In some embodiments, the application within the VCCA 205 that creates new VBEs 208 can be associated with the browser application 304 (e.g., with an icon or program selection accessible by a user to initiate the browser application 304) so that execution of the browser application 304 triggers the execution of the application.

After a new VBE 208 is created and an application is executed with the VBE 208 (e.g., the browser application 304), if the application wants to write data to its stacked file system 302, a copy-on-write ("COW") operation within the stacked file system 302 can create a new version of the file in the writable layer. This new version of the file can then be used by the VBE 208 for later reads and writes of that particular file. Accordingly, although VBEs 208 can start in generally the same state as the read-only file template (except for an IP address), the stacked file systems 302 of each VBE 208 can drift apart over time as applications executed within each VBE 208 modify their respective stacked file systems 302.

With continued reference to FIG. 3, the VBE 208 may execute the browser application 304. In some embodiments, depending on a browsing mode set for the VBE 208, the VCCA 205 may load preferences into the browser application 304 from the shared preference directory 118. The browser application 340, the VBE 208, the VCCA 205, or combinations thereof may also update or store preferences to the shared preference directory 118 based on the operation of the browser application 304 (e.g., if a user adds a new bookmark or accesses a new website).

As shown in FIG. 3, the browser application 304 may include or be associated with a browser helper application 306. The browser helper application 306 may be stored in one or more memory modules included in the hardware 112 and may be executed by one or more processors included in the hardware 112. In some embodiments, the browser helper application 306 may be stored as part of the browser application 304, as a separate application, or a combination thereof. As described below with respect to FIG. 4, the browser helper application 306 may monitor the operation of the browser application 304 and may provide information about the application's operation to the VCMA 206. For example, the browser helper application 306 may record websites accessed by the browser application 304, data downloaded by the browser application 304, data output by the browser application 304, data stored in the stacked file system 302 by the browser application 304, applications executed by the browser application 304, inter-process communications between the browser application 304 other applications executed within the computer 102, the virtual computer 202, or the VBE 208, and any attempts to do any of the foregoing.

It should be understood that in some embodiments the virtual computer 102 is not needed and the one or more VBEs 208 may be directly created by the host operating system 114. For example, in some embodiments, the VCA 116 may include the functionality of the VCCA 205 and the VCMA 206 and may be executed by the host kernel 114 of the host operating system 115 to create one or more VBEs 208 directly within the computer 102. Rather than sharing the guest kernel 204 as described above, the VBEs 208 created directly within the computer 102 may share the host kernel 115. For example, in some embodiments, the virtual computer 202 may be used to create a Linux virtual computing environment within a Windows-based operating system. The Linux virtual computing environment allows Linux-based light virtualization to be performed to create and manage the VBEs 208. However, if the host operating system 114 of the computer 102 is a Linux operating system, the virtual computer may be eliminated because the Linux-based light virtualization may be directly performed by the Linux host operating system. In addition, if Windows-based light virtualization is instead used to create and manage the VBEs 208 and the host operating system 114 is Windows-based, no separate virtual computer may be needed in order to use the Windows-based lightweight virtualization. In this regard, the virtual computer 202 may be used whenever the virtualization used to create the VBEs 208 is not supported by the host operating system 114 of the computer 102.

Accordingly, as used throughout the present specification, a VBE 208 may be described as sharing the kernel from the operating system "supporting" the VBE 208. Therefore, when a VBE 208 is created within the virtual computer 202, the guest operating system 203 may "support" the VBE 208 and the VBE 208, therefore, may share the guest kernel 204 of the "supporting" guest operating system 203. Similarly, when a VBE 208 is created directly within the computer 102, the host operating system 114 may "support" the VBE 208 and the VBE 208, therefore, may share the host kernel 115 of the "supporting" host operating system 114.

Figure 4:
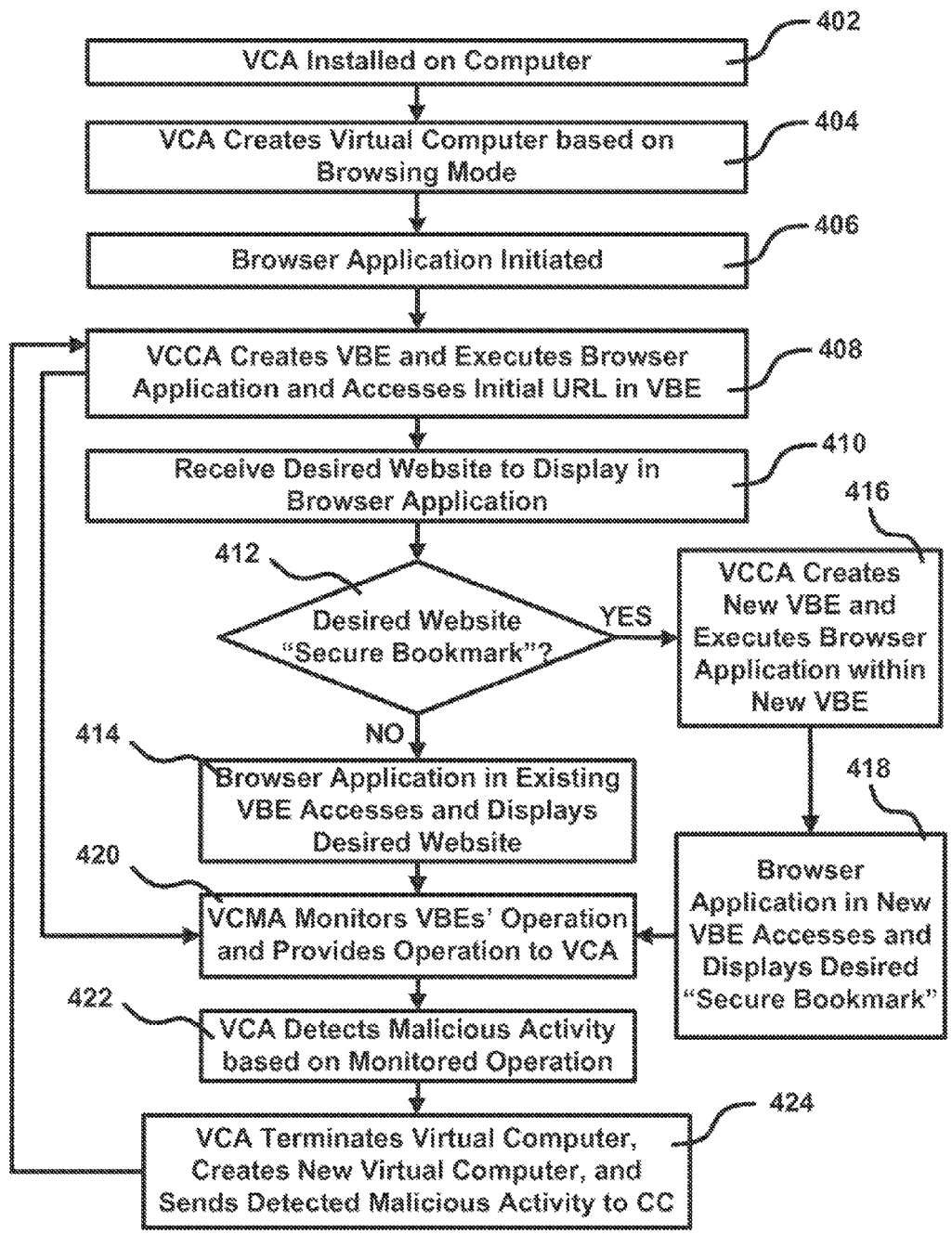
FIG. 4 is a flow chart illustrating a method of providing a virtual browsing environment using the system of FIG. 1, according to an aspect of an embodiment of the invention.

FIG. 4 illustrates a method of providing a virtual browsing environment performed by the system 100 according to one embodiment of the invention. It should be understood that the method illustrated in FIG. 4 may include more or less steps than those illustrated. The illustrated method may also be distributed among multiple methods or may be included as part of a larger method. Also, the method of FIG. 4 should not be construed as limiting the order, number, omission, addition, or other variation of the individual steps illustrated. As shown in FIG. 4, the VCA 116 may be initially installed on the computer 102 (at 402). It should be understood that the VCA 116 may be installed on the computer 102 from a computer-readable medium, such as a disk or drive, or over a network, such as the network 104. In some embodiments, when the VCA 116 is installed, a browsing mode may be set. For example, the browsing mode may be set to a master mode, a secure-bookmark mode, or a private mode. In some embodiments, a user may be prompted to set the browsing mode by selecting preferences upon installation or initiation of the VCA 116 (e.g., using a selection mechanism, such as a check box, a button, a toggle box, a drop-down menu, etc.). The VCA 116 may also include a default browsing mode that may be used if a user does not specify a particular browsing mode.

Once the VCA 116 is installed, the VCA 116 creates the virtual computer 202 based on the browsing mode (at 404). As described above with respect to FIG. 2, the virtual computer 202 may include the guest operating system 203, the guest kernel 204, the VCCA 205, and the VCMA 206, or combinations thereof. As also described above, in some embodiments, the guest operating system 203 may be different from the host operating system 114 of the computer 102. For example, the host operating system 114 may include a Microsoft Windows-based operating system and the guest operating system 203 may include a Linux-based operating system.

In some embodiments, the VCA 116 may create the virtual computer 202 upon boot-up of the computer 102. The VCA 116 may also create or build a "snapshot" of the virtual computer 202 upon its boot-up or initiation. The "snapshot" may be based on the read-only template included in the virtual computer 202, as described above. "Snapshots" are well-known in the computer industry and may be used to capture particular information about a currently-executing application, which may allow the application to be quickly restored to the captured state at a later point without having to restart the application from scratch. The UnionFS file system service for Linux may provide snapshot functionality. Accordingly, the VCA 116 may use the "snapshot" of the virtual computer 202 to quickly restart the virtual computer 202 at a later time, such as after it is terminated due to the detection of malicious activity (described below). It should be understood that if the one or more VBEs 208 are created directly in the computer 102 as described above, there may be no need to create the virtual computer 202 at 404.

After the virtual computer 202 is created and a browser application 304 is initiated (e.g., by a user or by another application) (at 406), the VCCA 205 may create a VBE 208, execute the browser application 304 within the VBE 208, and access an initial URL with the browser application 304 (at 408). In some embodiments, upon the VBE's 208 creation, the VCA 116 may capture a "snapshot" of a VBE 208. The "snapshot" may capture the VBE 208 with a "pristine" operating system before any potential malicious activity has occurred based on the user's operation of the browser application 304 within the VBE 208. As described above, a "snapshot" may be used to quickly restore an application to the captured state without having to completely restart the application from scratch. Therefore, the "snapshot" may allow the VCA 116 to quickly restore or create a new VBE 208, such as after a previous VBE 208 was terminated due to the detection of malicious activity (described below). It should be understood that the "snapshot" of the virtual computer 202 and the "snapshot" of the "pristine" VBE 208 may be combined in a single "snapshot." Additionally, if a virtual computer 202 is not used, the VCA 116 may just take a "snapshot" of the "pristine" VBE 208.

In some embodiments, the functionality of the browser application 304 executed within the VBE 304 may be modified based on a browsing mode. For example, if a browsing mode is set to a "master" mode, the browser application 304 executed within the VBE 208 may support many typical functions of a browser application 304 running directly on the computer 102. Accordingly, the browser application 304 may be imported with browsing preferences from the shared preference directory 118, such as browsing history, cookies, passwords, bookmarks, personal information, etc. In "master" mode, the browser application 304 may also store preferences to the shared preference directory 118, such as browsing history, bookmarks, cookies, passwords, add-ons, etc.

If the browsing mode is set to a "private" mode, the browser application 304 may be executed within the VBE 208 without importing any preferences from the shared preference directory 118 and without storing any new preferences to the shared preference directory 118. Therefore, the browser application 304 may be initiated and executed in an "anonymous" state where generally no personal data about the user interacting with the browser application 304 is accessible by the browser application 304. In some embodiments, a user may execute a browser application 304 in a "private mode" by selecting an icon or a program associated with separate browser application 304 configured to operate only in a "private mode." In other embodiments, an icon may be included and displayed within the browser application 340 that a user may click or select in order to activate an instance of the browser application 340 in "private mode." The new "private mode" instance may be included in or take the place of the current browser application 340 instance, may be created as a separate instance from the current browser application 340, or both.

If the browsing mode is set to a "secure-bookmark" mode, the functionality of the browser application 304 may be limited to accessing and interacting with a "secure bookmark." For example, as mentioned above, the shared preference directory 118 may store uniform resource locators ("URLs") associated with pre-configured websites specified as "secure bookmarks." A user may set a website where he or she interacts with (e.g., provides, retrieves, views, etc.) secure information (e.g., an online banking website), as a "secure bookmark." In some embodiments, a user may use a selection mechanism, such as a button or icon, a drop-down menu, or a check box, to set a website currently displayed in a browser application 304 as a "secure bookmark." The user may also type the URL of a website into a secure bookmark management interface, similar to bookmark management interfaces typically provided in browser applications, to set a particular URL as a "secure bookmark."

When the browser application 304 is executed in the "secure-bookmark" mode, the navigation tools of the browser application (e.g., the address line, a bookmark drop-down menu, a history menu, a previous and next selection mechanism, etc.) may be set to read-only, disabled, or removed from the browser application 304, which prevents a user from redirecting the browser application 304 to a different website. In some embodiments, the "secure-bookmark" mode browser application 304 may also be programmed to only access a predetermined set of websites (e.g., based on the "secure bookmark" website's per-service information and policy), which prevents the user from clicking on a link within a "secure bookmark" website and redirecting the browser application 304 to another (potentially un-secure) website. By limiting the functionality of the browser application, the "secure-bookmark" mode may provide enhanced security for accessing sensitive websites. For example, a user may use the "secure-bookmark" mode when performing secure transactions, such as online banking and shopping. The limited functionality of the browser application 304 may also prevent other browser instances or other websites from spying or interfering with the user's transactions. In addition, in some embodiments, a separate directory in the shared preference directory 118 may be created (e.g., by the browser application 304; the VBE 208; the VCCA 205, such as a daemon or application executed within the VCCA 205; the VCA 116; or combinations thereof) and associated with each web site designated as a "secure bookmark." The separate directory may store preferences and other metadata associated with each "secure bookmark" website, such as passwords, account numbers, usernames, etc. In some embodiments, each separate directory may only be accessed when the browser application 304 is operated in a "secure-bookmark" mode and when the browser application is accessing the "secure bookmark" associated with the separate directory.

The browser application's download and upload functionality may also be limited to provide enhanced computer security in one or all of the browsing modes described above. For example, in a "private" mode, the browser application 304 may prohibit all file uploads or downloads. Similarly, in a "master" or "secure-bookmark" mode, the browser application 304 may allow downloads and/or uploads but may restrict the type or storage location of files uploaded and/or downloaded. For example, in a "master" mode or "secure-bookmark" mode, the browser application 304 may prevent any executable files from being uploaded or downloaded and may limit file downloads or uploads to non-system file folders or location, non-program file folders or location, and/or the "desktop" file folder.

The number of instances of each mode of the browser application that may be executing at the same time on the computer 102 or within the virtual computer 202 may be limited. For example, in some embodiments, there may be only one instance of a "master" mode browser application 304 running at one time. Therefore, if a user initiates a "master" mode browser application 304 (e.g., clicks on an icon associated with the browser application 304) while a "master" mode browser application 304 is already running, a new tab may be opened within the running "master" mode browser application 304 rather than initiating another execution thread or process of the browser application 304. In contrast, in some embodiments, a user may initiate multiple "private" mode browser applications or "secure-bookmark" mode browser applications, and each "private" or "secure-bookmark" mode browser application 304 may be initiated and executed within a separate VBE 208. Each browser application mode may be visually distinguishable from the other modes in order to identify the browsing mode of a particular browser application to a user.

In some embodiments, the browsing mode may be based on how the browser application 304 is initiated on the computer 102. For example, if a user or another application initiates the browser application 304 with a specified initial URL (e.g., by clicking on a website link within an electronic document displayed by the computer 102, selecting a save website shortcut stored on the computer 102, etc.), the VCCA 205 may decide a browsing mode based on whether the specified URL corresponds to a "secure bookmark." If the specified URL corresponds to a "secure bookmark," the VCCA 205 may execute the browser application 304 in a "secure-bookmark" mode and may access the specified initial URL. If the specified URL does not correspond to a "secure bookmark," the VCCA 205 may execute the browser application 304 in either a "master" mode or a "private" mode (e.g., depending on which mode as been specified by a user or is set as a default mode) and may access the specified initial URL. Alternatively, if a user or another application initiates the browser application 304 without specifying a particular initial URL (e.g., by clicking on a browser application icon on the desktop of the computer 102), the VCCA 205 may execute the browser application 304 in either a "master" mode or a "private" mode (e.g., depending on which mode as been previously selected by a user or is set as a default mode) and may access an initial default or "home" URL.

Returning to FIG. 4, after the browser application 304 is executed within the VBE 208 and the browser application 304 accesses the initial URL (either a specified initial URL or a default or "home" URL) (at 408), the VCMA 206 may monitor the VBE's behavior and provides information about the VBE's behavior to the VCA 116 (at 420). This functionality is described in detail below. However, as shown in FIG. 4, after the browser application 304 accesses the initial URL (at 408), the browser application 304 may receive a desired website to access and display (at 410). For example, after an initial website is displayed, a user may specify a desired website in various ways, such as by typing a URL in an address line of the browser application 304, clicking on a link within the currently displayed website in the browser application 304, or selecting a website from a drop-down menu (e.g., a favorites menu, a history menu, etc.) (e.g., see FIG. 7). When a desired website is specified, the VCCA 205 may determine whether the desired website corresponds to a "secure bookmark" (at 412).

In some embodiments, the VCCA 205 may determine whether the desired website corresponds to a "secure bookmark" by comparing the specified desired website to a file of URLs previously set as "secure bookmarks." For example, as described above, the shared preference directory 118 may store URLs associated with pre-configured websites specified as "secure bookmarks." If the desired website does not correspond to a URL specified in the shared preference directory 118 as a "secure bookmark" (at 412), the browser application 304 in the existing VBE 208 may access and display the desired website (at 414).

If, however, the desired website corresponds to a URL specified in the shared preference directory 118 as a "secure bookmark" (at 412), the VCCA 205 may create a new VBE 208 and may execute the browser application 304 within the new VBE 208 (at 416). As described above, the VBE 208 may execute the browser application 304 in a "secure-bookmark" mode, which modifies the navigation tools of the browser application 304 and access a separate directory in the shared preference directory 118 that stores preferences and other metadata associated with the desired "secure bookmark." Once the VBE 208 executes the browser application 304 within the new VBE 208, the browser application 304 may access and display the desired "secure bookmark" (at 418).

Figure 5:
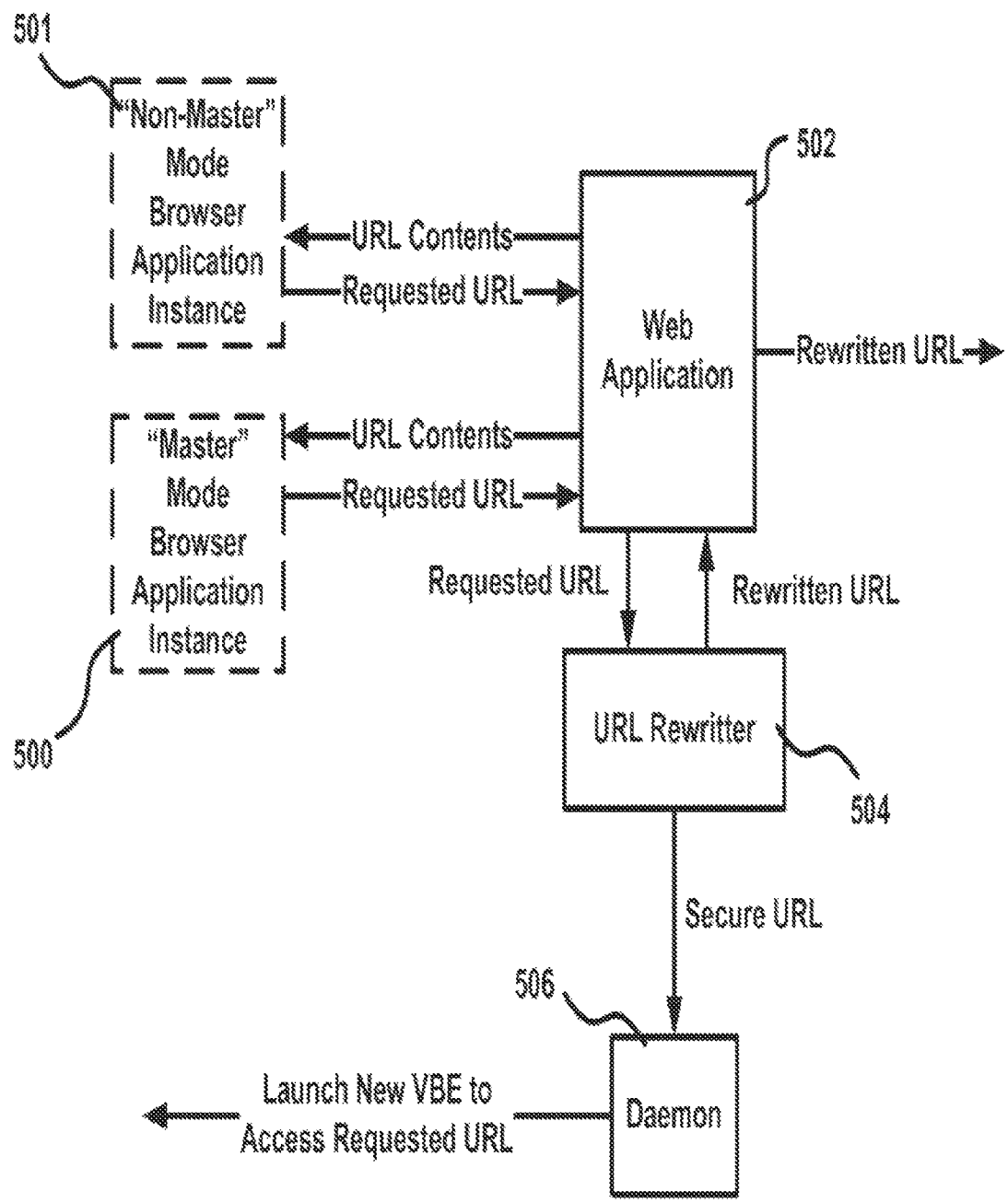
FIG. 5 illustrates a method of determining whether a desired website corresponds to a secure bookmark, according to an aspect of an embodiment of the invention.

FIG. 5 illustrates in more detail a process for determining whether a desired website corresponds to a "secure bookmark" according to one embodiment of the invention. As shown in FIG. 5, instances of the browser application 304 (e.g., a "master" mode browser application instance 500 and a "non-master" mode browser application instance 501) may generate URL requests. In some embodiments, however, a secure bookmark may only be specified from within a master mode browser application instance. For example, in a "private" mode, no browsing preferences, such as any previously-specified "secure bookmarks" may be imported into the browser application instance. Similarly, in a "secure-bookmark" mode, the navigation tools of the browser application may be disabled, which includes the ability to enter a new URL in the address line or choose a website from a menu of bookmarks or secure bookmarks. Accordingly, as shown in FIG. 5, URL requests from browser application instances may be categorized as either requests from "master" mode browser application instances, which may include requests to access a "secure bookmark," and requests from "non-master" mode browser application instances, which generally cannot include requests to access "secure bookmark."

As shown in FIG. 5, the browser application instances 500 and 501 may interact with a web application 502 (e.g., a Squib web proxy). In some embodiments, the web application 502 may be included in the VCCA 205. Transmission control protocol ("TCP") connections not using the proper web application 502 port (e.g., port 3128) may be blocked by one or more firewalls provided by the host or supporting operating system, which may be inaccessible and invisible for processes executing inside the VBEs 208. In some embodiments, if the proxy settings of an instance of the browser application 304 are modified, either by a user or by another application (e.g., malware), the browser application instance may be blocked from reaching the network 104.

The web application 502 may support a feature called URL-rewrite. When this feature is enabled, the web application 502 may forward each URL request to a URL rewriter application 504. The rewriter application 504 may check the origin of the URL request. If the request does not originate from a "master" mode browser application instance 500 (e.g., from a predetermined, fixed IP address that is generally always assigned to a "master" mode browser application instance) but rather comes from a "non-master" browser application instance 501, the rewriter application 504 may return a rewritten URL (e.g., the originally requested URL) to the web application 502, which may obtain the contents of the requested URL and forward the contents to the "non-master" browser application instance 501. It should be understood that in some embodiments, the web application 502 may also be configured to determine whether a URL request comes from a "private" mode browser application instance or a "secure-bookmark" mode browser application instance if these instances are configured to allow a secure bookmark to be selected or accessed.

When the URL request originates from a "master" mode browser application instance 500, the rewriter application 504 may determine if the requested URL corresponds to a "secure bookmark." In particular, as described above, the rewriter 504 may determine if the requested URL corresponds with a URL stored in the shared preference directory 118 that is specified as a "secure bookmark." If the requested URL doesn't correspond with a previously-specified "secure bookmark," the rewriter application 504 may return a rewritten URL (e.g., the originally requested URL) to the web application 502, which may obtain the contents of the requested URL and may forward the contents to the "master" mode browser application instance 500.

If, however, the URL request from the "master" mode browser application instance 500 corresponds to a previously-specified "secure bookmark," the rewriter application 504 may return a rewritten URL to the web application 502. The rewritten URL may redirect the "master" mode browser application instance 500 making the request to a website or message indicating that a new "secure-bookmark" mode browser application instance has been launched for a requested "secure bookmark." In some embodiments, the rewritten URL may be served by a local web computer or server (e.g., a tiny hypertext transfer protocol web server).

As shown in FIG. 5, if the URL request from the "master" mode browser application instance 500 corresponds to a previously-specified "secure bookmark," the rewriter application 504 may also send the requested "secure bookmark" URL to a backend application or daemon 506. The daemon application 506 may be included in the VCCA 205. Upon receiving the secure bookmark URL, the daemon application 506 may invoke an application or script that creates a new VBE 208 within the virtual computer 202 and specifies the requested "secure bookmark" URL as the initial URL to access (e.g., as an input parameter). As described above, the browser application instance running with the new VBE 208 may be a "secure-bookmark" mode browser application instance, which may be assigned a different IP address than a "master" mode browser application instance.

To access the "secure bookmark," the "secure-bookmark" mode browser application instance executed with the new VBE 208 may send the requested URL to the web application 502, which may forward the request to the rewriter application 504. However, because the requesting instance is a "secure-bookmark" mode browser application instance (i.e., a "non-master" browser application instance) rather than a "master" mode browser application instance, the rewriter application 504 may not determine whether the requested URL corresponds to a secure bookmark, but may simply return a rewritten URL (e.g., the originally requested URL) to the web application 502. The web application 502 may use the returned URL to obtain the contents of the requested URL and forward the contents to the "secure-bookmark" mode browser application instance executing within the new VBE 208.

Returning to FIG. 4, after a browser application 304 executing within a VBE 208 accesses a website (e.g., the initial URL at 408, the desired non-secure-bookmark website at 414, or the desired secure bookmark website at 418), the VCMA 206 may monitor the behavior or operation of each VBE 208 and may provide information about the operation of each VBE 208 to the VCA 116 (at 420). The information about each VBE's operation may include the websites accessed by the browser application 304 and the browser application's interaction with the guest operating system 203. For example, the VCMA 206 may monitor and keep track of when the browser application 304 downloads one or more files, uploads one or more files, executes or attempts to execute another application, attempts to communication with other applications within the VBE 208, accesses or attempts to access a particular application or particular data stored within the memory modules of the hardware 112, attempts to contact other computers connected to the computer 102 over at least one network, etc. As described above with respect to FIG. 3, the browser application 304 executed within each VBE 208 may include a browser helper application 306. The browser helper application 306 may collect all or a portion of the operational information provided to the VCMA 206, and ultimately provided to the VCA 116. For example, the browser helper application 306 may keep track of each URL accessed by the browser application 304. In some embodiments, the browser helper application 306 may store the URLs accessed by the browser application 304 to the shared preference directory 118 in addition to or in place of providing this information to the VCMA 206. The VCA 116 may then access the URL information from the shared preference directory 118 when the VCA 116 needs the information.

The VCA 116 may use the information about each VBE's operation to determine whether the operation of a particular VBE 206 indicates that potential malicious activity is occurring within the VBE 208 (at 422). Because in some embodiments the browser application 304 is the only application executed within a particular VBE 208, the VCA 116 may use the information about a VBE's operation to determine whether the operation is consistent or inconsistent with the normal operations of a browser application 304. For example, the VCA 116 may be configured with a set of "normal" interactions between a browser application and an operating system, set as caching data and creating and managing cookies. If the operation occurring with a particular VBE 208 is something other than these identified "normal" interactions, the VCA 116 may flag the operation or interaction as potential malicious activity.

Therefore, the isolation and specialized use of a VBE 208 may allow the VCA 116 to easily detect potential malicious activity. In particular, when a browser application 304 is executed directly within the computer 304 rather than within a virtual environment (e.g., a VBE 208), the "normal" operations requested of and performed by the computer's host operating system 114 may include many types of operations. For example, the host operating system 114 may execute multiple executable files, may store a file or data, may access one or more files or data, may modify a system file associated with the operating system, etc. This large range of "normal" operation occurs because many different applications may be simultaneously executed by the host operating system 114 within the computer 102. However, because the sole application executed with the VBE 208 may be the browser application 304, the types of "normal" or legitimate operations may be more limited, which may make it easier to detect potential malicious activity or operation.

In addition, if the VCA 116 detects potential malicious activity, the VCA 116 may terminate and automatically restore virtual computer 202, one or more VBEs 208, one or more instances of the browser application 304, or combinations thereof, (at 424) which kills the potential malicious activity before it may cause damage. This type of termination generally cannot be efficiently performed at the computer-level for each potential malicious activity because it would require termination and rebooting of the entire computer 102. Accordingly, using the VBEs 208 to execute the browser application 304 may allow the VCA 116 to better detect potential malicious activity and may allow the VCA 116 to react quickly and efficiently without requiring a reboot of the entire computer 102. Therefore, even if the potential malicious activity isn't truly malicious activity, the VCA 116 hasn't required a user to completely reboot the computer 102 but has only required the user to create a new VBE 208 and execute a new instance of the browser application 304 within the new VBE. In addition, as described above, in some embodiments, the VCA 116 may use a "snapshot" of the virtual computer 202 and/or a "snapshot" of a "pristine" VBE 208 to further increase the speed and efficiency of creation a new virtual computer 202 and/or a new VBE 208 quickly after the VCA 116 detected potential malicious activity and terminated these components.

As described below with respect to FIGS. 11 and 12, in some embodiments, the VCA 116 may only terminate and restore the virtual computer 202, one or more VBEs 208, one or more instances of the browser application 304, or combinations thereof if the user manually requests the termination. In other embodiments, the VCA 116 may automatically terminate one or more components of the computer 102 after it detects potential malicious activity either immediately or after a predetermined amount of time. In addition, the VCA 116 may be set to automatically terminate one or more components of the computer 102 after a predetermined time period regardless of whether potential malicious activity has been detected. For example, the VCA 116 may automatically terminate the virtual computer 202 and/or a VBE 208 if the component has been active for more than predetermined amount of time (e.g., 1 to 5 hours).

In some embodiments, after terminating one or more components of the computer 102 due to potential malicious activity, the VCA 116 may also collect information about the potential malicious activity and send the information to the collection computer 108 (at 424). The collected information may include one or more URLs where the potential malicious activity potentially originated from. The VCA 116 may obtain the one or more URLs associated with the detected potential malicious activity based on the information gather by the browser helper application 306. If a browser application instance accesses one URL at a time, the VCA 116 may time-correlate the particular URL associated with the detected malicious activity. However, if multiple instances or windows of a browser application 304 are executing simultaneously, the VCA 116 may perform time-correlation heuristics to correlate the potential malicious activity to one or more potential URLs accessed approximately at the same time the potential malicious activity occurred. For example, assume a user accessed the following emails at the following time: www.goosite.com (11:29 a.m.); www.badsite.com (11: 30 a.m.); and www.other.com (11:32 a.m.). If the VCA 116 determines that a potential malicious attack, such as a modification to a system file, occurred at 11:30 a.m., the VCA 116 may determine that the website www.badsite.com, accessed by the user at 11:30, is probably the source of the malicious attack. The time correlation heuristics may identify multiple URLs as potentially associated with the potential malicious activity, and, in some embodiments, the VCA 116 may allow a user to manually modify the one or more URLs identified as the source of potential malicious activity.

The collected information may also include forensic information about what the potential malicious activity did while running in the VBE 208 (e.g., all reads and writes performed on any files, all modifications or attempted modifications to registry entries, and all network communications). The collected information may also include configuration settings. For example, the version of browser application 340 executed within the VBE 208 and information about the host computer 102, such as its hardware configuration, may be included in the collected information. In general, any information that may help understand and identify malicious attempt may be included in the collected information. In some embodiments, private information may be stripped from the collected information before it is sent to the collection computer 108.

The collected information may also include information about the potential malicious activity, such as a signature of an executable downloaded or executed by the browser application 304. In some embodiments, the VCA 116 may only send the collected information about potential malicious activity to one or more collection computers 108 if the user provides permission. User permission may be provided on a case-by-case basis (e.g., by prompting the user to designate whether to send the collected information each time the VCA 116 detects potential malicious activity) or as a preconfigured preference for the VCA 116. The VCA 116 may also store the collected information and may use the collected information to automatically block a browser application from subsequently accessing a URL previously associated with malicious activity or to alert a user that a desired website was previously associated with malicious activity. In addition, the VCA 116 may be configured to display a list of URLs previously associated with malicious activity to a user.

The collection computer 108 may store the collected information about potential malicious activity to a database included in the collection computer 108 or to an external database. In order to mitigate the effects of a user who attempts to launch a denial of service ("DoS") attack, the collection computer 108 may limit the amount of information or traffic received from a given user to a maximum amount (e.g., a maximum amount of information per day). The collection computer 108 may use the collected information about the potential malicious activity to identify new malicious activity present on the network 104. For example, the collection computer 108 may provide the collected malicious activity information to security organizations, such as the Anti-Phishing Group or OpenDNS to label certain URLs, files, or executables as being associated with malicious activity. This functionality may allow the collection computer 108 to provide zero-day malicious activity detection. This functionality may also be based on a human user's real-world use of a browser application rather than on an automated application designed to crawl a network and detect malicious, which is what many current security organization use to identify malicious. In addition, if the collection computer 108 receives collected malicious activity information from multiple computers 102, the system 100 may provide a distributed continuous malicious activity detection system based on human, rather than automated behavior.

Figure 6:
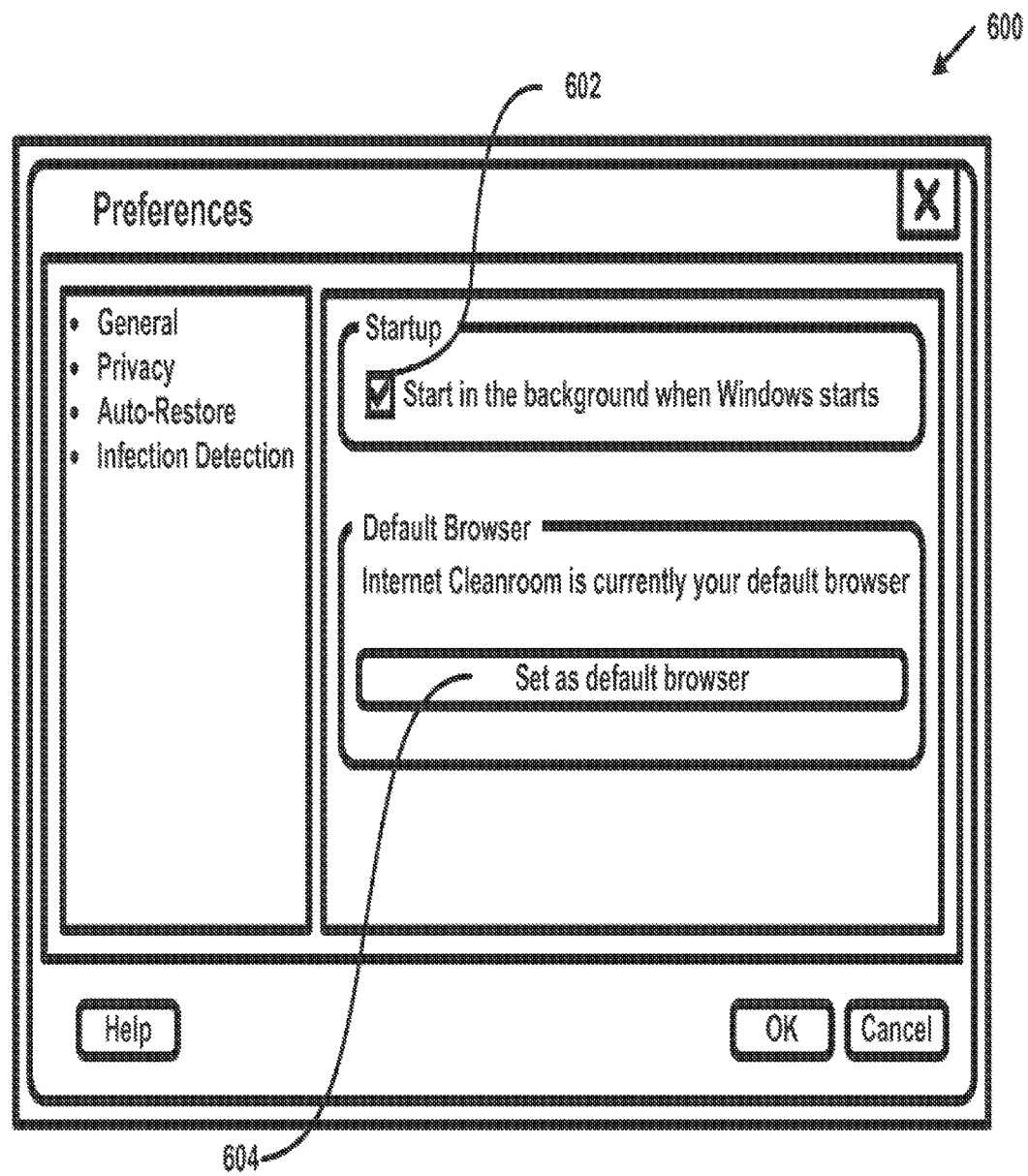
FIG. 6 illustrates a user interface that allows a user to select preferences for a virtual browsing environment, according to an aspect of an embodiment of the invention.

FIGS. 6-12 illustrate various user interfaces generated by the system 100. For example, FIG. 6 illustrates a user interface 600 that allows a user to select preferences for the VCA 116. As shown in FIG. 6, a user (e.g., an administrator) may use the interface 600 to specify how the VCA 116 should create the virtual computer 202. In particular, a user may use a startup selection mechanism 602 (e.g., a check box) to specify whether the VCA 116 should create the virtual computer 202 in the background when the host operating system 114 is started or booted. A user or administrator may also use the interface 600 to set the browser application 304 that will be executed within a VBE 208 as the default browser application using a set-as-default selection mechanism 604 (e.g., a button). It should be understood that the user interface 600 may allow a user or an administrator to set other preferences for the VCA 116, such as a default browser mode (e.g., "master" mode or "private" mode"), preferences setting how the VCA 116 should restore one or more VBEs 208 after they are terminated, how long VBEs 208 should be active before they are automatically terminated, what type of interaction or operation within a VBE 208 is associated with potential malicious activity, what actions to take upon detecting potential malicious activity, etc.

Figure 7:
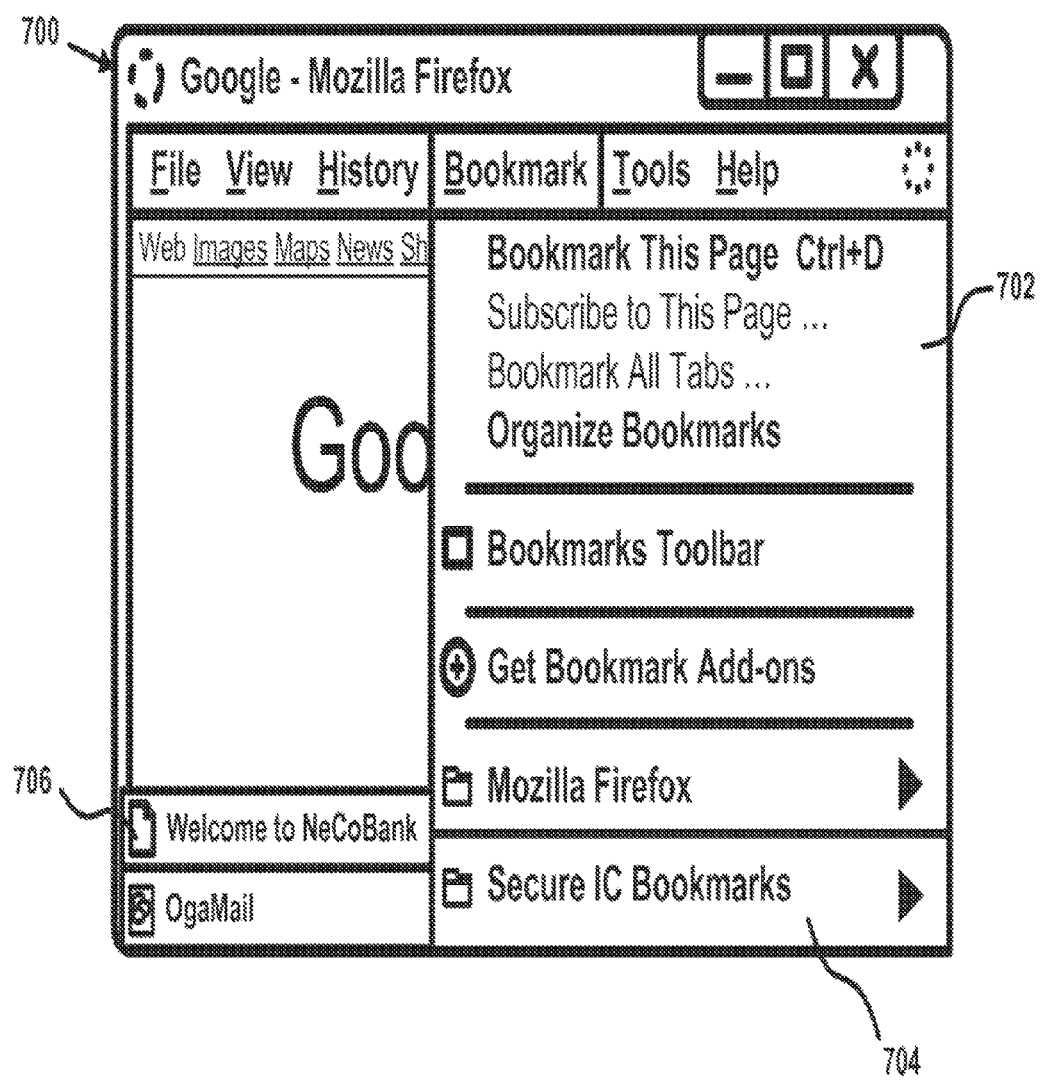
FIG. 7 illustrates a user interface that allows a user to select a secure bookmark within a browser application executed within a virtual browsing environment, according to an aspect of an embodiment of the invention.

FIG. 7 illustrates a user interface 700 that allows a user to select a secure bookmark within a browser application according to one embodiment of the invention. As shown in FIG. 7, the interface 700 may include a bookmark drop-down menu 702. The bookmark drop-down menu 702 may include a secure bookmarks folder 704 that lists one or more websites, such as 706, previously designated as a "secure bookmark." As described above with respect to FIGS. 4 and 5, if a user selects a website specified as "secure bookmark" from the bookmark drop-down menu 702, the VCCA 205 may create a new VBE 208 and may execute the browser application 304 within the new VBE 208 in a "secure-bookmark" mode.

Figure 8:
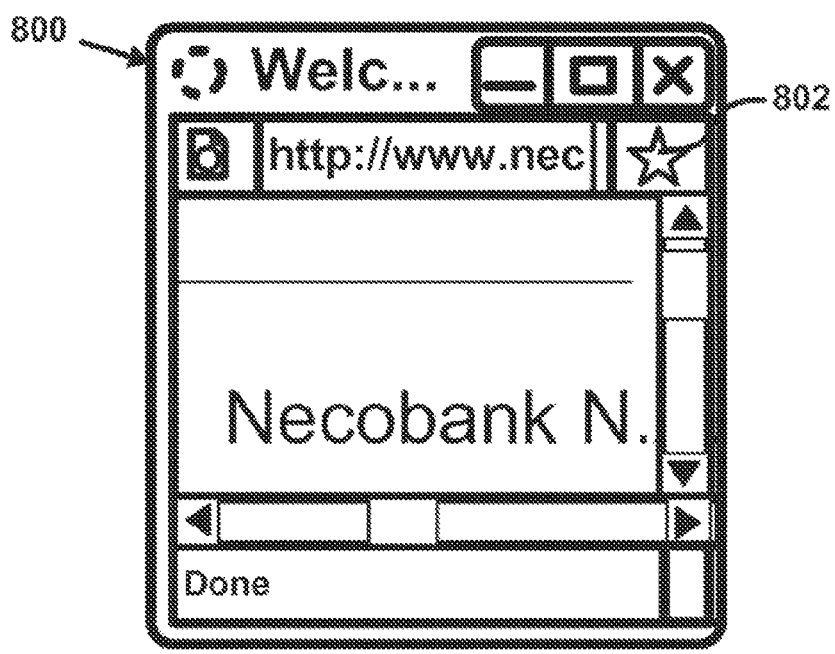
FIG. 8 illustrates a user interface that displays a secure bookmark within a browser application executed within a virtual browsing environment, according to an aspect of an embodiment of the invention.

FIG. 8 illustrates a user interface 800 that displays a "secure bookmark" within a "secure-bookmark" mode browser application 304 according to one embodiment of the invention. As shown in FIG. 8, the navigation tools of the browser application 304, such as an address line 802, may be disabled in order to prevent the browser application 304 from being redirected to another, potentially unsecure website. For example, as described above, the address line 802 may be set to be read-only, which prevents a user from typing in a URL for the browser application to access. As also shown in FIG. 8, the interface 800 may not include a bookmark drop-down menu, a history drop-down menu, a home selection mechanism, etc. Again, as described above, these features may be disabled (i.e., removed from the interface 800) in order to prevent a user from navigating the browser application to another, potentially unsecure, website.

Figure 9:
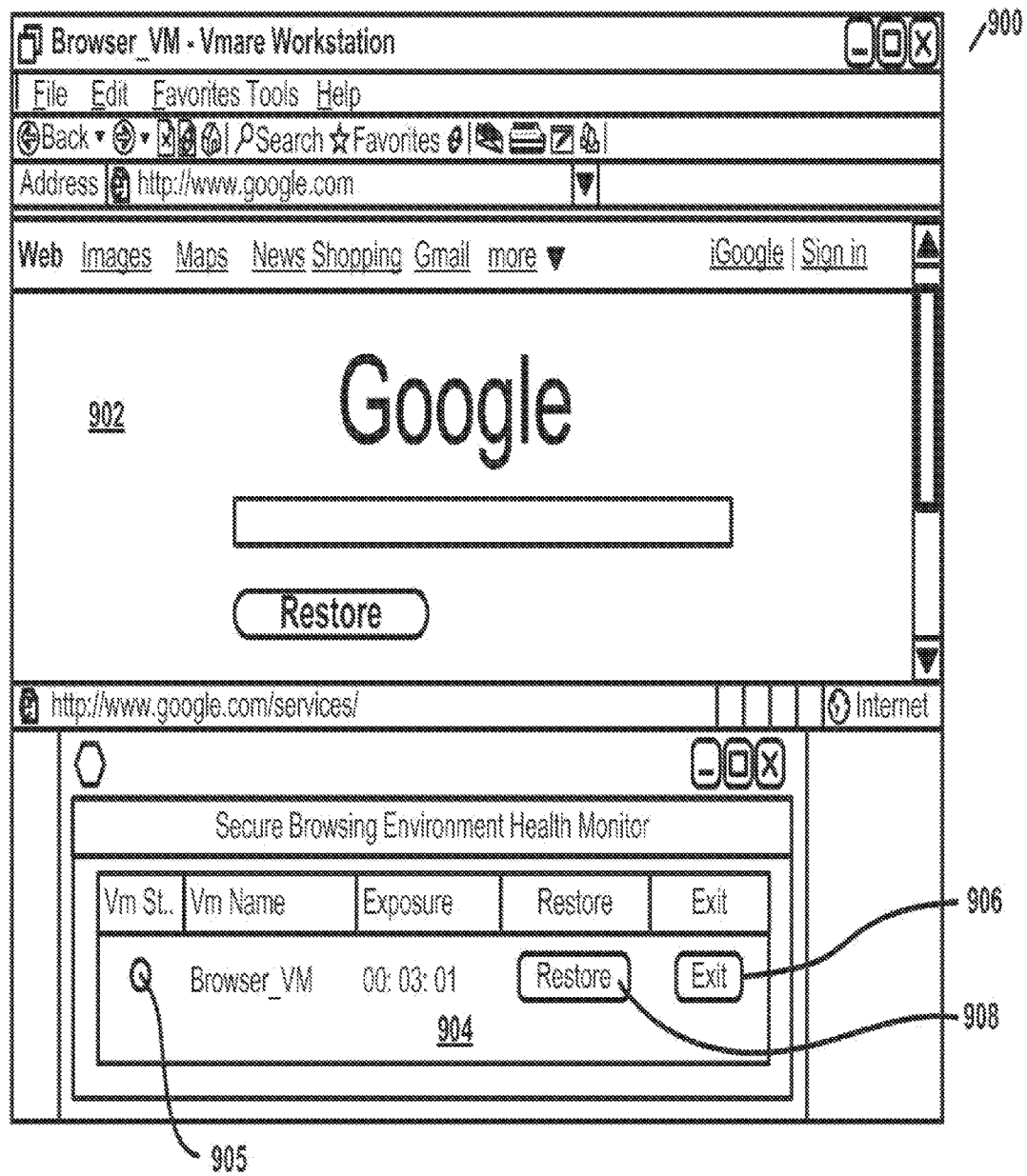
FIG. 9 illustrates a user interface that displays a website within a browser application executed within a virtual browsing environment and displays a health monitor for the browser application, according to an aspect of an embodiment of the invention.

FIG. 9 illustrates a user interface 900 that displays a website 902 within a browser application 304 and displays a health monitor 904 according to one embodiment of the invention. As shown in FIG. 9, the health monitor 904 may display information to a user about the status of the browser application 304 and/or the VBE 208 executing the browser application 304. The displayed information may include a visual depiction of a health status 905 (e.g., a green light for "healthy," a yellow light for "caution," and a red light for "warning" or "unhealthy"). The displayed information may also include an amount of time that the VBE 208 and/or the browser application 304 has been active or running. In addition, the health monitor 904 may include a restore selection mechanism 906 (e.g., a button) and a terminate selection mechanism 908 (e.g., a button). A user may select the restore selection mechanism 906 to terminate the browser application 304 and/or the VBE 208 executing the browser application 304 and automatically create a new instance of the browser application 304 and/or a new VBE to execute the new browser application instance. Similarly, a user may select the terminate selection mechanism 908 to terminate the browser application 304 and/or the VBE 208 executing the browser application 304 without automatically creating a new instance of the browser application 304 and/or a new VBE 208 for executing the new browser application instance.

Figure 10:
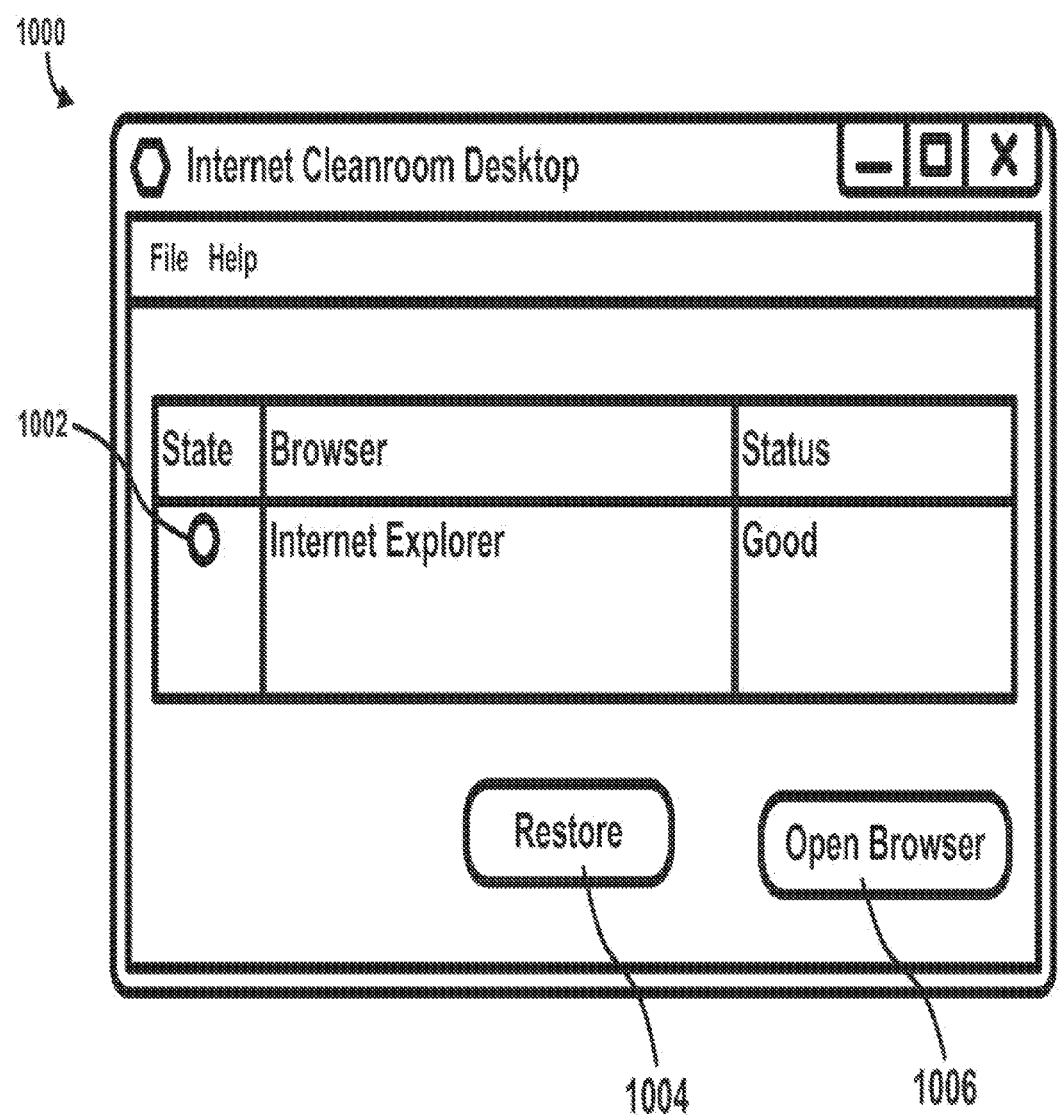
FIG. 10 illustrates a user interface that displays a health monitor of a browser application executed within a virtual browsing environment, according to an aspect of an embodiment of the invention.

FIG. 10 illustrates another health monitor 1000 according to one embodiment of the invention. As shown in FIG. 10, the health monitor 1000 may include a visual depiction 1002 of the health of the browser application 304 and/or the VBE 208 executing the browser application 304, such as a green light, a yellow light, or a red light. The health monitor 1000 may also include a textual depiction of the health of the browser application 304 (e.g., "Good," "Infection Detected," etc.). As shown in FIG. 10, the health monitor 1000 may also include a restore selection mechanism 1004 (e.g., a button) and an open-browser selection mechanism 1006 (e.g., a button). A user may select the restore selection mechanism 1004 to terminate the browser application 304 and/or the VBE 208 executing the browser application 304 and automatically create a new instance of the browser application 304 and/or a new VBE 208 for executing the new browser application instance. Similarly, a user may select the open-browser selection mechanism 1006 to create a new instance of the browser application 304 within a new VBE 208 if one is not already running within the VBE 208. For example, a user may use the open-browser selection mechanism to open a "master" mode browser instance if one is not already running. It should be understood that the health monitors 904 and 1000 may be positioned in the same interface or window as a website displayed by the browser application 304 or may be part of a separate interface or window.

Figure 11:
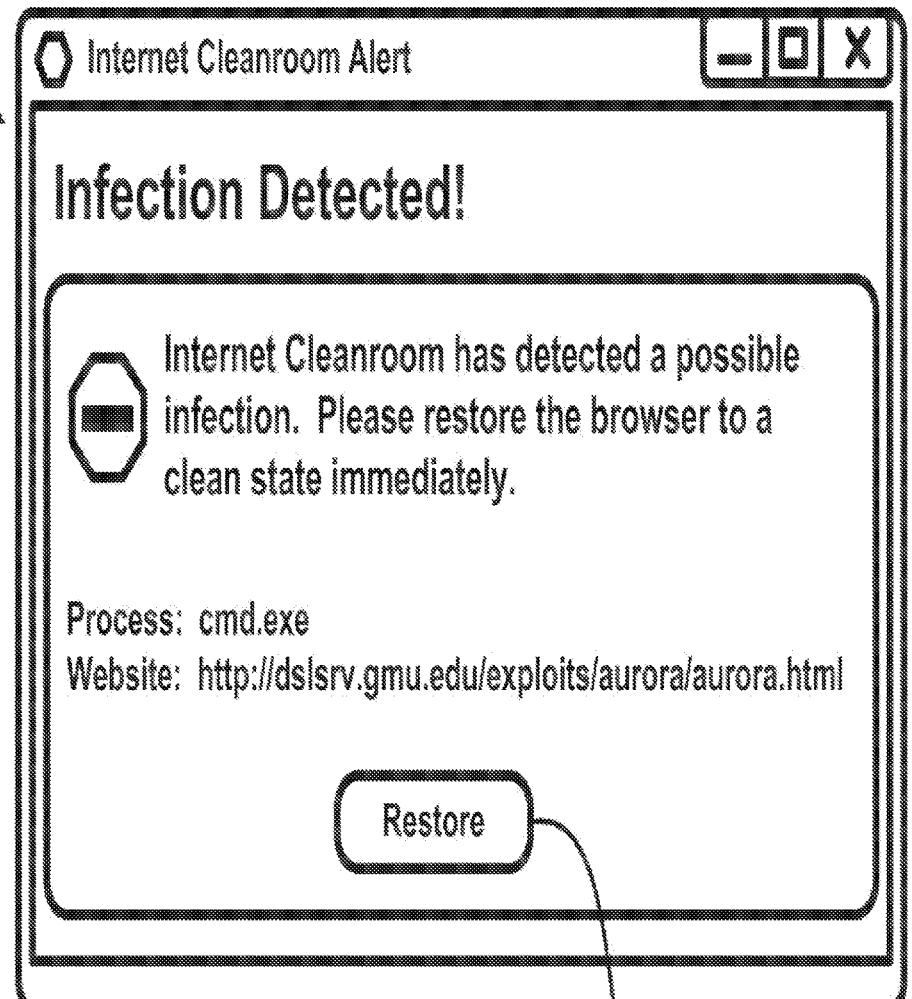
FIG. 11 and FIG. 12 illustrate user interfaces that display alerts to a user regarding a browser application executed within a virtual browsing environment, according to an aspect of an embodiment of the invention.
Figure 12:
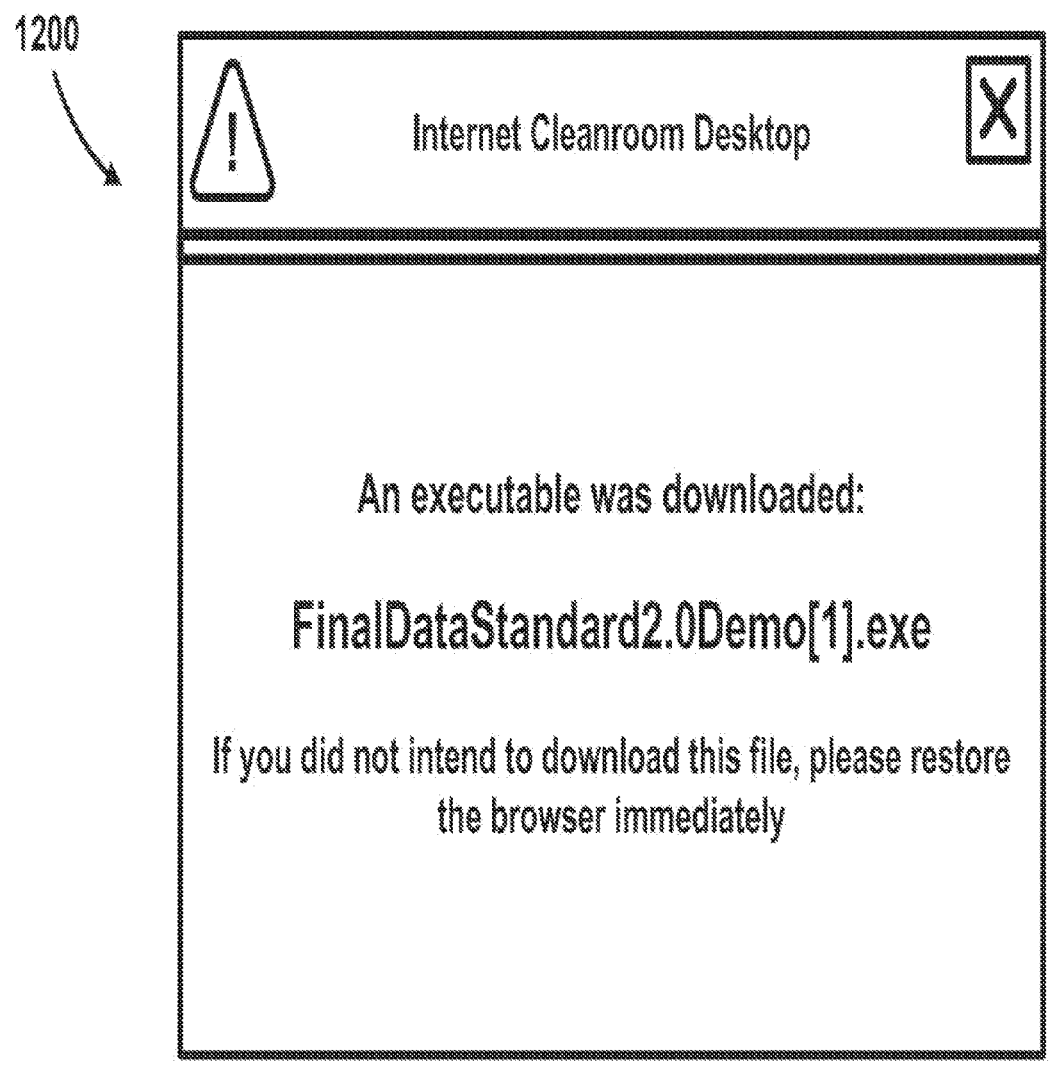

FIGS. 11 and 12 illustrate user interfaces that display alerts to a user regarding a browser application and/or the VBE 208 executing the browser application 304 according to some embodiments of the invention. For example, FIG. 11 illustrates a user interface 1100 that may alert a user that potential malicious activity (i.e., a potential "infection") has been detected by the VCMA 206. The user interface 1100 may also include a restore selection mechanism 1102 (e.g., a button). As instructed in the message within the interface 1100, a user may select the restore selection mechanism 1102 to terminate the browser application 304 and/or the VBE 208 executing the browser application 304 and automatically create a new instance of the browser application 304 and/or a new VBE 208 to execute the new browser application instance. FIG. 12 illustrates another user interface 3040 that may alert a user that potential malicious activity has occurred in the form of the downloading of an executable file. The user interface 3040 may also instruct a user to restore (i.e., terminate and restart) the browser application 304 and/or the VBE 208 where the download occurred if the user did not intend to download the executable file.

It should be understood that the user interfaces 1100 and 3040 may be positioned in the same interface or window as a website displayed by the browser application 304 or may be part of a separate interface or window. Additionally, in some embodiments, the user interface 1100 and 3040 may inform a user that the browser application 304 and/or the VBE 208 executing the browser application 304 will be automatically restored rather than instructing a user to perform the restoration manually. For example, the user interfaces 1100 and 3040 may include a message that the browser application 304 and/or the VBE 208 executing the browser application 304 will automatically be restored after a predetermined period of time. The user interfaces 1100 and 3040 may also include a timer showing the time remaining before an automatic restoration is performed.

It should be understood that although embodiments of the invention have been described with respect to a browser application 304, the embodiments may be used with other types of applications. In particular, the VBEs 208 may be used to isolate the execution of any type of application. For example, a separate VBE 208 may be used to execute any application downloaded from another computer (e.g., over the Internet), any application that includes an invalid or unverifiable certificate, any application executed on a public computer, any user-initiated application, or combinations thereof.

In this specification, "a" and "an" and similar phrases are to be interpreted as "at least one" and "one or more."

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

Before embodiments of the invention are described in detail, it should be understood that the terms "computer," "database," "application," and "module" can represent hardware, or software in combination with hardware. In addition, the computers, databases, applications, and modules described herein can be implemented on standard, general-purpose computers or as specialized devices.

While various embodiments have been described above, it should be understood that they have been presented by way of example, and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above described example embodiments.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. An apparatus, comprising:
   a memory; and
   a hardware processor operatively coupled to the memory, the hardware processor configured to execute a control application, the control application configured to receive a request to execute a first browser process, the control application configured to initiate, based on the request, the first browser process within a virtual browsing environment,
   the control application configured to receive an identifier associated with a website in response to the first browser process requesting to access the website;
   the control application configured to instruct the first browser process to access the website when the identifier is not associated with a secure bookmark; and
   the control application configured to instruct a second browser process executing outside the virtual browsing environment to access the website when the identifier is associated with the secure bookmark.

2. The apparatus of claim 1, wherein the control application is configured to initiate the virtual browsing environment in response to receiving the request.

3. The apparatus of claim 1, wherein the website is a first website, the control application is configured to identify potential malicious activity within the virtual browsing environment based on an operation of the first browser process, the control application configured to correlate an indication of the operation with an identifier of a second website based on a time associated with the first browser process accessing the second website and a time associated with the operation.

4. The apparatus of claim 1, wherein the website is a first website, the control application is configured to send, to a collector and in response to identifying potential malicious activity within the virtual browsing environment, an identifier of a second website and an indication of an operation associated with the first browser process accessing the second website.

5. The apparatus of claim 1, wherein the control application is configured to initiate the first browser process using a first operating system, the first operating system being within the virtual browsing environment,
   the hardware processor configured to execute a second operating system, the second operating system configured to execute the virtual browsing environment.

6. A method, comprising:
   receiving, at a compute device, a request to execute a first browser process;
   initiating, based on the request, the first browser process using an operating system within a virtual browsing environment on the compute device;
   receiving, from the first browser process, a request to access a website;
   identifying the website as associated with a secure bookmark; and
   initiating, in response to the website being associated with the secure bookmark, a second browser process outside the virtual browsing environment to access the website.

7. The method of claim 6, further comprising:
   initiating the virtual browsing environment in response to receiving the request to access the first browser process.

8. The method of claim 6, further comprising:
   terminating the virtual browsing environment in response to identifying potential malicious activity within the virtual browsing environment based on an operation of the operating system within the virtual browsing environment.

9. The method of claim 6, wherein the website is a first website, the method further comprising:
   identifying potential malicious activity within the virtual browsing environment based on an operation of the operating system within the virtual browsing environment; and
   correlating an indication of the operation with an identifier of a second website based on a time associated with the first browser process accessing the second website and a time associated with the operating system performing the operation.

10. The method of claim 6, wherein the website is a first website, the method further comprising:
    identifying, at a first time, potential malicious activity within the virtual browsing environment based on the first browser process accessing a second website and an operation of the operating system within the virtual browsing environment; and
    preventing, at a second time after the first time, the first browser process from accessing the second website based on the identifying the potential malicious activity.

11. The method of claim 6, wherein the operating system is a virtualized operating system, the virtual browsing environment executing under control of a host operating system of the compute device.

12. The method of claim 6, further comprising:
    identifying potential malicious activity within the virtual browsing environment based on an operation of the operating system within the virtual browsing environment;
    capturing a snapshot of a state of the virtual browsing environment at a time prior to the identifying the potential malicious activity; and
    restoring, in response to the identifying the potential malicious activity and using the snapshot, the virtual browsing environment to the state of the virtual browsing environment at the time.

13. An apparatus, comprising:
    a memory; and
    a hardware processor operatively coupled to the memory, the hardware processor configured to execute a control application, the control application configured to receive, from a first browser process executing within a virtual browsing environment, a request to access a website,
    the control application configured to identify the website as associated with a secure bookmark,
    the control application configured to initiate execution of a second browser process outside the virtual browsing environment in response to the website being associated with the secure bookmark such that the second browser process accesses the website.

14. The apparatus of claim 13, wherein the virtual browsing environment is a first virtual browsing environment, the control application is configured to initiate execution of the second browser process within a second virtual browsing environment distinct from the first virtual browsing environment.

15. The apparatus of claim 13, wherein the control application is configured to identify the website as associated with the secure bookmark based on comparing an identifier associated with the website to a list of secure bookmarks stored in a shared preference directory.

16. The apparatus of claim 13, wherein the control application is configured to terminate the virtual browsing environment in response to identifying potentially malicious activity within the virtual browsing environment based on an operation of the first browser process.

17. The apparatus of claim 13, wherein the control application is configured to receive a request to execute the first browser process, the control application configured to initiate, based on the request, the first browser process within the virtual browsing environment.

18. The apparatus of claim 13, wherein:
the control application is configured to capture a snapshot of a state of the virtual browsing environment at a time,
the control application is configured to identify, after the time, potential malicious activity within the virtual browsing environment based on an operation of the first browser process within the virtual browsing environment, and
the control application is configured to restore, in response to identifying the potential malicious activity and using the snapshot, the virtual browsing environment to the state of the virtual browsing environment at the time.

19. The apparatus of claim 13, wherein the hardware processor is configured to execute a first operating system, the first operating system configured to execute the virtual browsing environment,
the virtual browsing environment configured to include a second operating system, the second operating system configured to execute the first browser process.

20. The apparatus of claim 1, wherein the virtual browsing environment is a first virtual browsing environment, the control application is configured to initiate execution of the second browser process within a second virtual browsing environment distinct from the first virtual browsing environment.

21. The method of claim 6, wherein the virtual browsing environment is a first virtual browsing environment, the initiating the second browser process includes initiating the second browser process within a second virtual browsing environment distinct from the first virtual browsing environment.

* * * * *

UNITED STATES PATENT AND TRADEMARK OFFICE
CERTIFICATE OF CORRECTION

PATENT NO. : 9,436,822 B2  Page 1 of 1
APPLICATION NO. : 14/480657
DATED : September 6, 2016
INVENTOR(S) : Anup K. Ghosh It is certified that error appears in the above-identified patent and that said Letters Patent is hereby corrected as shown below:

Claims

Column 20, line 8 (claim 7, line 3): "access" should be --execute--

Signed and Sealed this
Eighth Day of November, 2016

Michelle K. Lee
*Director of the United States Patent and Trademark Office*